US010929075B2

(12) United States Patent
Kako et al.

(10) Patent No.: US 10,929,075 B2
(45) Date of Patent: Feb. 23, 2021

(54) PRINT CONTROL DEVICE PERFORMING PRINT CONTROL FOR PRINTING OBJECT ON UPPER TAPE TO BE AFFIXED TO LOWER TAPE, AND NOTIFYING OF ERROR WHEN OBJECT MEETS PRECONDITION BUT DOES NOT MEET ALL OF PRESCRIBED CONDITIONS

(71) Applicant: BROTHER KOGYO KABUSHIKI KAISHA, Nagoya (JP)

(72) Inventors: Keigo Kako, Nagoya (JP); Junya Kawai, Anpachi-gun (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/832,848

(22) Filed: Mar. 27, 2020

(65) Prior Publication Data
US 2020/0409636 A1    Dec. 31, 2020

(30) Foreign Application Priority Data

Jun. 28, 2019    (JP) .............................. JP2019-122198

(51) Int. Cl.
*G06F 3/12*    (2006.01)
*G06K 15/00*    (2006.01)
(Continued)

(52) U.S. Cl.
CPC ............ *G06F 3/1243* (2013.01); *G06F 3/121* (2013.01); *G06F 3/1205* (2013.01);
(Continued)

(58) Field of Classification Search
CPC ...... G06F 3/1205; G06F 3/1208; G06F 3/121; G06F 3/1242; G06F 3/1243;
(Continued)

(56) References Cited

U.S. PATENT DOCUMENTS 6,979,139 B2 * 12/2005 Hine ...................... B41J 3/4075
                                                           400/615.2
7,278,797 B2 * 10/2007 Akaiwa .................. B41J 3/4075
                                                           400/609
(Continued)

FOREIGN PATENT DOCUMENTS

| JP | 2003-001896 A | 1/2003 |
| JP | 2015-066826 A | 4/2015 |

*Primary Examiner* — Scott A Rogers
(74) *Attorney, Agent, or Firm* — Kenealy Vaidya LLP

(57) ABSTRACT

A print control device includes a controller. The controller edits an image constituted by one or more objects including one or more upper objects, acquires an image area length, an image area width, a lower tape length, and a lower tape width, designates one upper object from among the one or more upper objects, and acquires an object area length, an object area width, and an upper tape width. In a case where a precondition is met for the designated upper object, the controller sets an orientation to a parallel orientation when a first condition or a third condition is met, and sets the orientation to an orthogonal orientation when a second condition or a fourth condition is met. The controller issues an error notification when the precondition is met but all of the first condition, the second condition, the third condition, and the fourth condition are not met.

8 Claims, 14 Drawing Sheets

(51) Int. Cl.
*G06K 15/02* (2006.01)
*H04N 1/00* (2006.01)
*H04N 1/23* (2006.01)

(52) U.S. Cl.
CPC .......... *G06F 3/1208* (2013.01); *G06F 3/1255* (2013.01); *G06K 15/022* (2013.01); *G06K 15/1868* (2013.01); *G06K 15/408* (2013.01); *G06K 15/4065* (2013.01); *H04N 1/00005* (2013.01); *H04N 1/00015* (2013.01); *H04N 1/00034* (2013.01); *H04N 1/00074* (2013.01); *H04N 1/00082* (2013.01); *H04N 1/00204* (2013.01); *H04N 1/00708* (2013.01); *H04N 1/00771* (2013.01); *H04N 1/00774* (2013.01); *H04N 1/233* (2013.01); *H04N 1/2323* (2013.01); *H04N 1/2384* (2013.01); *H04N 2201/0082* (2013.01)

(58) Field of Classification Search
CPC .... G06F 3/1253; G06F 3/1255; G06F 3/1257; G06K 15/022; G06K 15/024; G06K 15/1868; G06K 15/4065; G06K 15/408; H04N 1/00005; H04N 1/00015; H04N 1/00034; H04N 1/00074; H04N 1/00082; H04N 1/00204; H04N 1/00708; H04N 1/0071; H04N 1/00713; H04N 1/00771; H04N 1/00774; H04N 1/2323; H04N 1/233; H04N 1/2384; H04N 2201/0082; B41J 3/4075

See application file for complete search history.

(56) References Cited

U.S. PATENT DOCUMENTS

| | | | |
|---|---|---|---|
| 7,318,681 B2 * | 1/2008 | Kato | B41J 3/4075 |
| | | | 400/615.2 |
| 10,055,172 B2 * | 8/2018 | Nakagawa | G06F 3/121 |
| 2002/0197090 A1 | 12/2002 | Akaiwa | |
| 2014/0226170 A1 * | 8/2014 | Ishii | G06K 15/1806 |
| | | | 358/1.12 |

* cited by examiner

FIG. 1
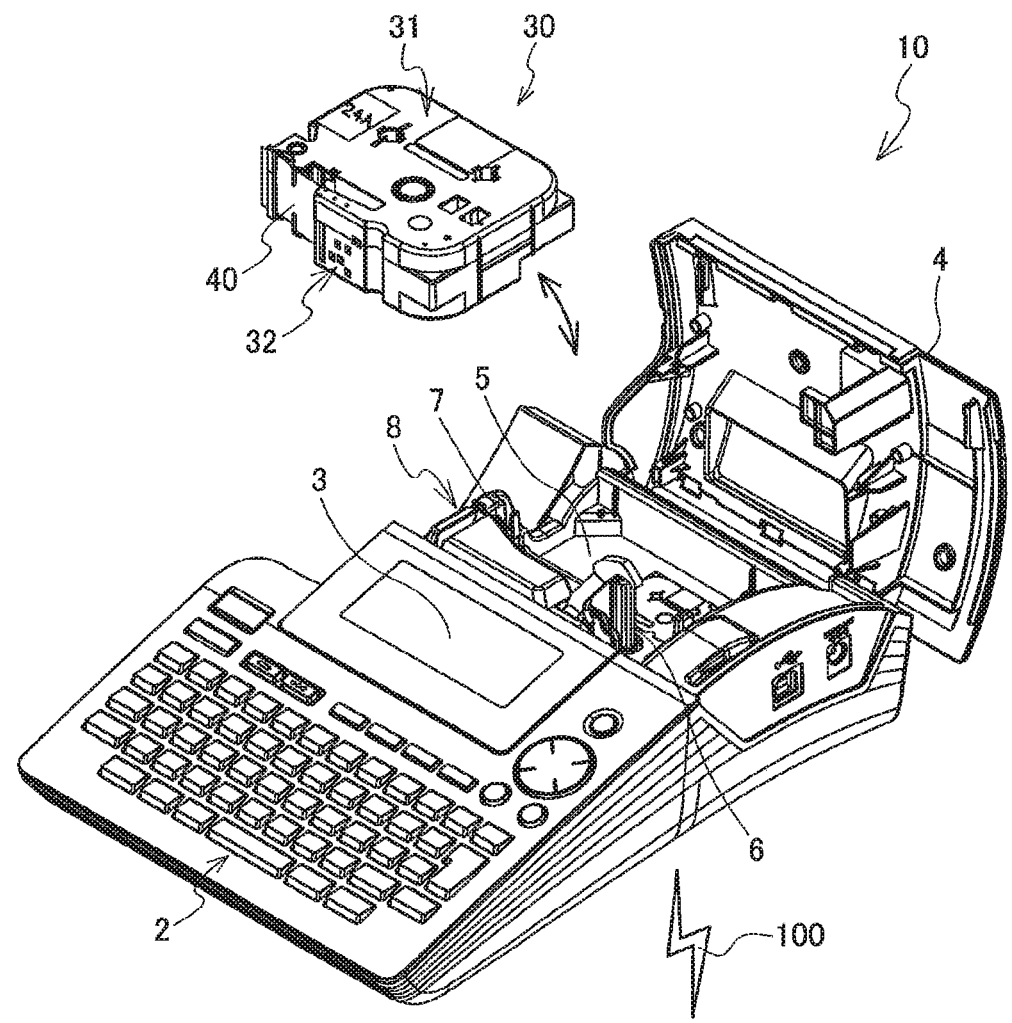
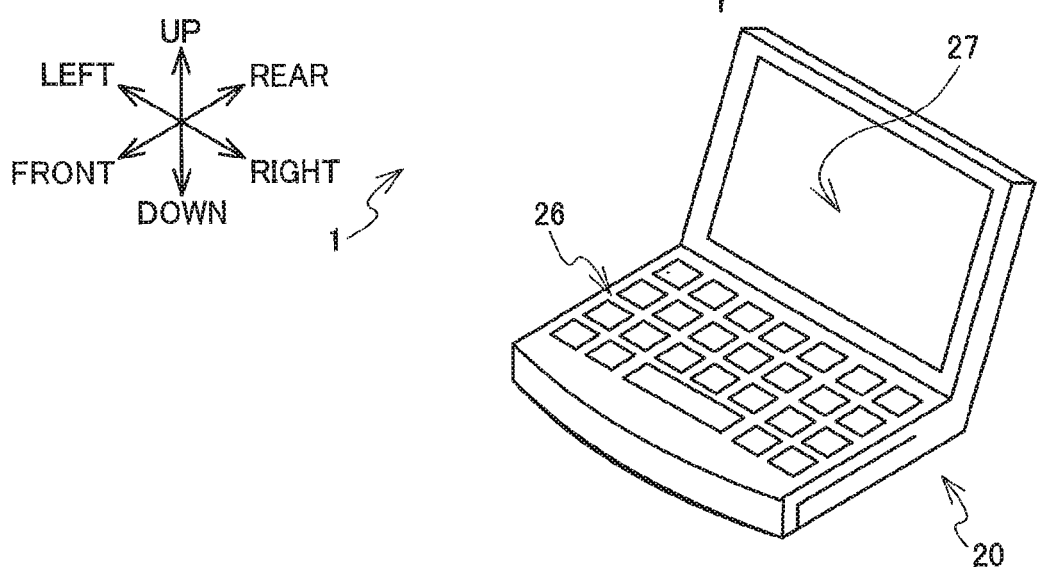

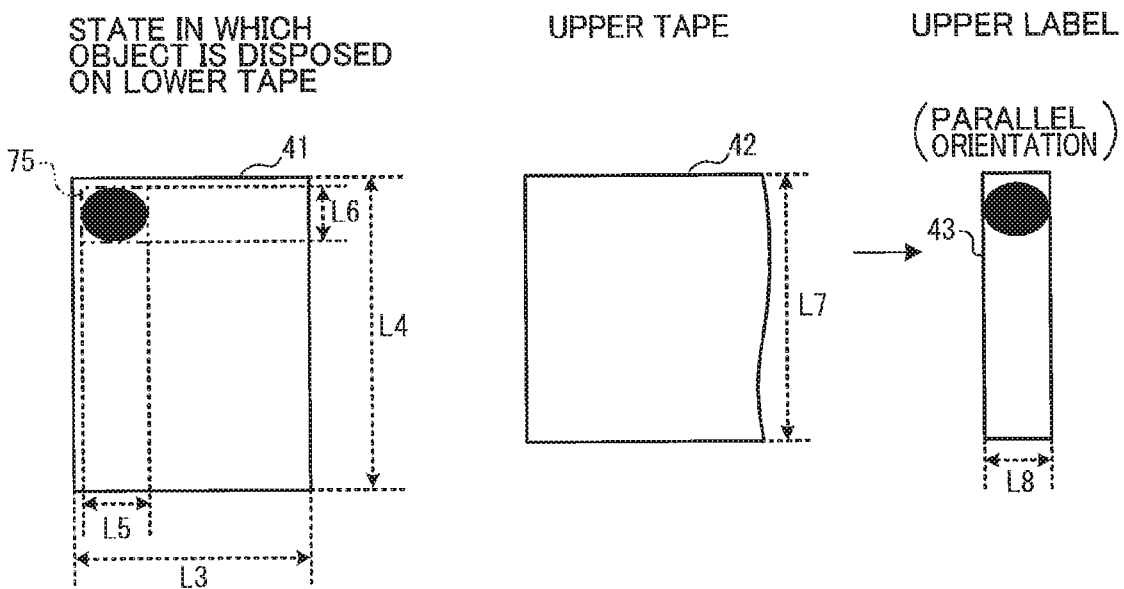
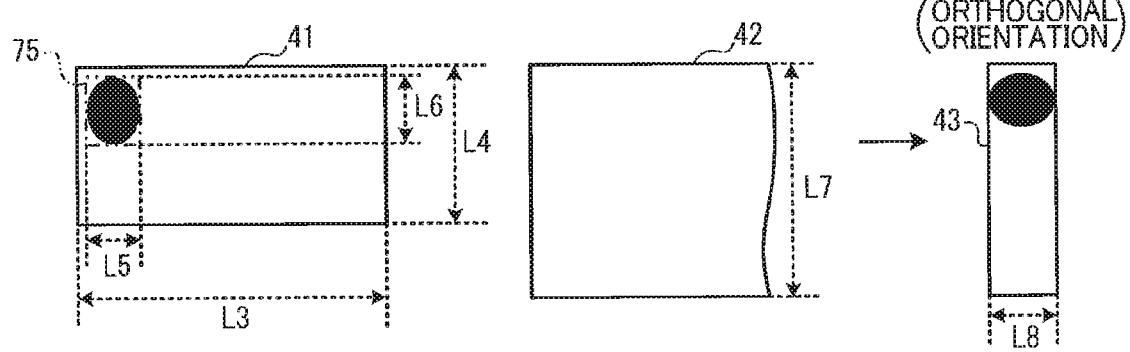

FIG. 6A  STATE IN WHICH OBJECT IS DISPOSED ON LOWER TAPE    UPPER TAPE
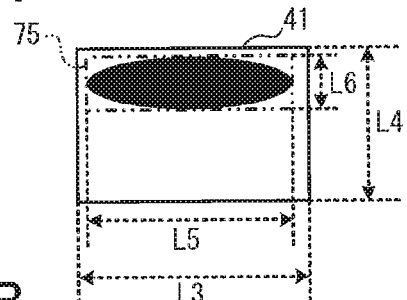 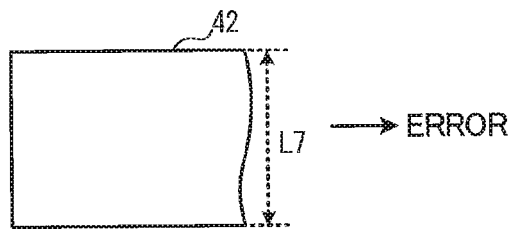 → ERROR
FIG. 6B
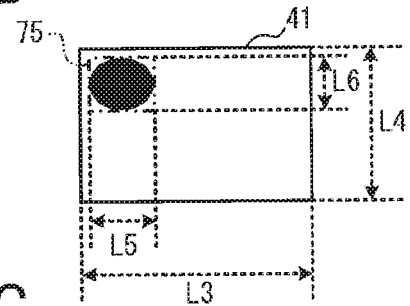 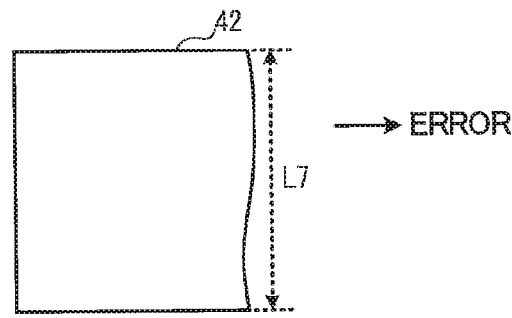 → ERROR
FIG. 6C
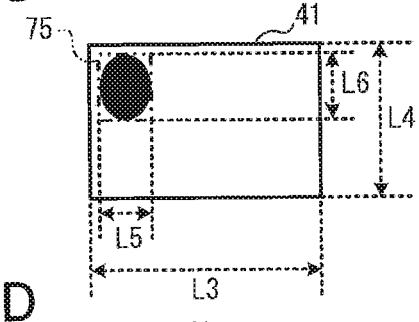 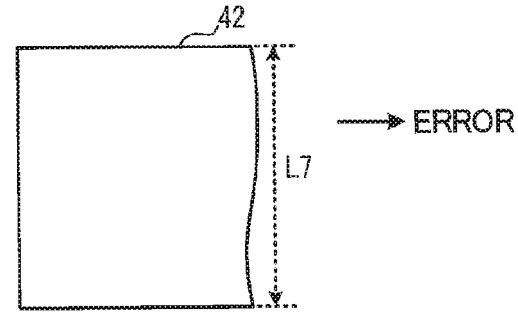 → ERROR
FIG. 6D
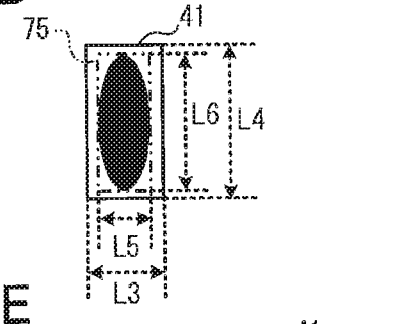 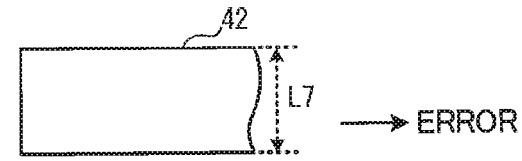 → ERROR
FIG. 6E
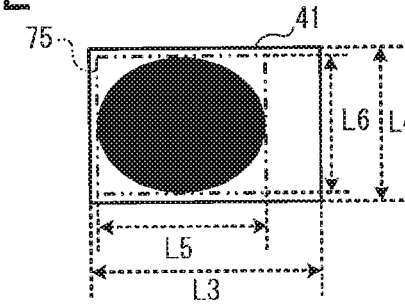 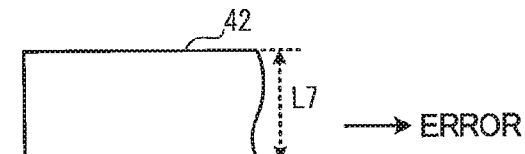 → ERROR

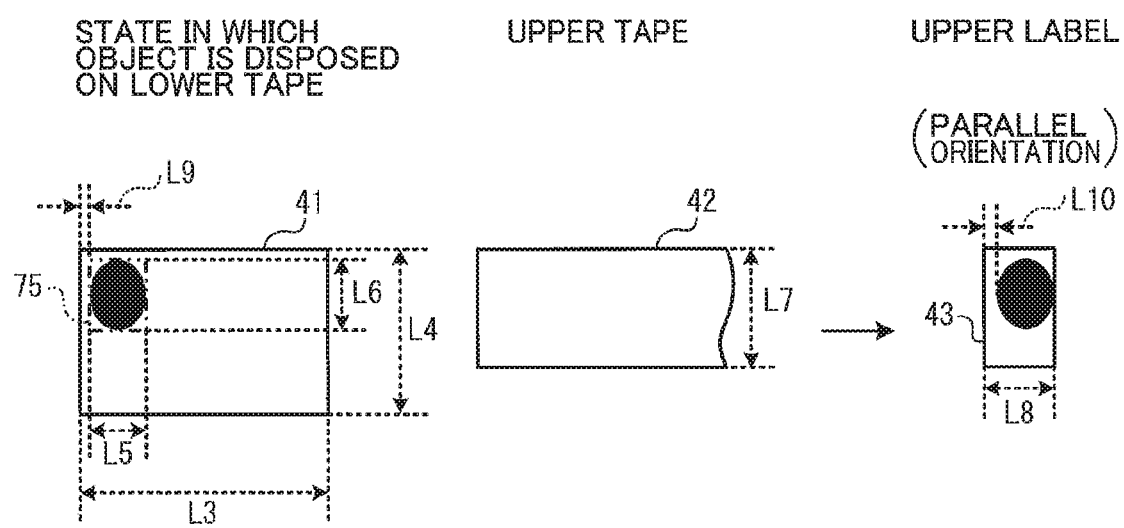

US 10,929,075 B2

PRINT CONTROL DEVICE PERFORMING PRINT CONTROL FOR PRINTING OBJECT ON UPPER TAPE TO BE AFFIXED TO LOWER TAPE, AND NOTIFYING OF ERROR WHEN OBJECT MEETS PRECONDITION BUT DOES NOT MEET ALL OF PRESCRIBED CONDITIONS

CROSS REFERENCE TO RELATED APPLICATION

This application claims priority from Japanese Patent Application No. 2019-122198 filed Jun. 28, 2019. The entire content of the priority application is incorporated herein by reference.

TECHNICAL FIELD

The present disclosure relates to a print control device.

BACKGROUND

In the printer described in JP 2015-66826A, an object is printed on a lower tape and an object is printed on an upper tape. The lower tape having the object printed thereon is affixed with the upper tape having the object printed thereon in such a manner that the longitudinal direction of the upper tape coincides with the longitudinal direction of the lower tape.

SUMMARY

In the above printer, a tape that can be used as the upper tape may be limited in its width according to the size of an object to be printed on the upper tape.

In view of the foregoing, it is an object of the present disclosure to provide a print control device capable of suppressing limitation of the width of a tape that can be used as the upper tape to be affixed to the lower tape.

In order to attain the above and other objects, according to one aspect, the present disclosure provides a print control device for performing a print control for printing one or more objects on an upper tape to be affixed to a lower tape. The print control device includes a controller configured to perform: (a) editing an image constituted by one or more objects including: one or more lower objects to be printed on the lower tape; and one or more upper objects to be printed on the upper tape; (b) acquiring: an image area length that is a length of an image area in a longitudinal direction of the lower tape, the image area being an area occupied by a rectangle surrounding the image edited in (a); an image area width that is a length of the image area in a width direction of the lower tape; a lower tape length that is a length of the lower tape in the longitudinal direction; and a lower tape width that is a length of the lower tape in the width direction; (c) designating one upper object from among the one or more upper objects; (d) acquiring: an object area length that is a length of an object area in the longitudinal direction, the object area being an area occupied by a rectangle surrounding the one upper object designated in (c); and an object area width that is a length of the object area in the width direction; (e) acquiring an upper tape width that is a length of the upper tape in a width direction of the upper tape; (f) setting, when a precondition and a first condition are both met, an orientation to a parallel orientation, the orientation being a direction in which the upper tape is disposed relative to the one or more lower objects disposed on the lower tape, the parallel orientation being an orientation in which a longitudinal direction of the upper tape is made to coincide with the longitudinal direction of the lower tape; (g) setting, when the precondition and a second condition are both met, the orientation to an orthogonal orientation, the orthogonal orientation being an orientation in which the longitudinal direction of the upper tape is made to coincide with the width direction of the lower tape; (h) setting, when the precondition and a third condition are both met, the orientation to the parallel orientation; (i) setting, when the precondition and a fourth condition are both met, the orientation to the orthogonal orientation; (j) issuing, when the precondition is met and all of the first condition, the second condition, the third condition, and the fourth condition are not met, an error notification; and (k) executing the print control on the basis of the orientation set in any one of (f), (g), (h), and (i). The precondition includes: a condition that the image area length is smaller or equal to the lower tape length; and a condition that the image area width is smaller or equal to the lower tape width. The first condition includes: a condition that the object area width is smaller than the upper tape width; and a condition that the upper tape width is smaller than the object area length. The second condition includes: a condition that the object area width is smaller than or equal to the object area length; and a condition that the object area length is smaller than or equal to the upper tape width. The third condition includes: a condition that the object area length is smaller than the object area width; and a condition that the object area width is smaller than or equal to the upper tape width. The fourth condition includes: a condition that the object area length is smaller than or equal to the upper tape width; and a condition that the upper tape width is smaller than the object area width.

According to another aspect, the present disclosure provides a print control device for performing a print control for printing one or more objects on an upper tape to be affixed to a lower tape. The print control device includes a controller configured to perform: (a) editing an image constituted by one or more objects including: one or more lower objects to be printed on the lower tape; and one or more upper objects to be printed on the upper tape; (b) acquiring: an image area length that is a length of an image area in a longitudinal direction of the lower tape, the image area being an area occupied by a rectangle surrounding the image edited in (a); an image area width that is a length of the image area in a width direction of the lower tape; a lower tape length that is a length of the lower tape in the longitudinal direction; and a lower tape width that is a length of the lower tape in the width direction; (c) designating one upper object from among the one or more upper objects; (d) acquiring: an object area length that is a length of an object area in the longitudinal direction, the object area being an area occupied by a rectangle surrounding the one upper object designated in (c); and an object area width that is a length of the object area in the width direction; (e) acquiring an upper tape width that is a length of the upper tape in a width direction of the upper tape; (f) when a precondition and a first condition are both met, (f1) setting an orientation to a parallel orientation, the orientation being a direction in which the upper tape is disposed relative to the one or more lower objects disposed on the lower tape, the parallel orientation being an orientation in which a longitudinal direction of the upper tape is made to coincide with the longitudinal direction of the lower tape; and (f2) setting an upper tape length to the object area length acquired in (d), the upper tape length being a length of the upper tape in the longitudinal direction of the upper tape; (g) when the precondition and a second condition are both met, (g1) setting the orientation to an orthogonal orientation, the orthogonal orientation being an orientation in which the longitudinal direction of the upper tape is made to coincide with the width direction of the lower tape; and (g2) setting the upper tape length to the object area width acquired in (d); (h) when the precondition and a third condition are both met, (h1) setting the orientation to the parallel orientation; and (h2) setting the upper tape length to the object area length acquired in (d); (i) when the precondition and a fourth condition are both met, (i1) setting the orientation to the orthogonal orientation; and (i2) setting the upper tape length to the object area width acquired in (d); (j) issuing, when the precondition is met and all of the first condition, the second condition, the third condition, and the fourth condition are not met, an error notification; and (k) executing the print control on the basis of the orientation and the upper tape length which are set in any one of (f), (g), (h), and (i). The precondition includes: a condition that the image area length is smaller or equal to the lower tape length; and a condition that the image area width is smaller or equal to the lower tape width. The first condition includes: a condition that the object area width is smaller than the upper tape width; and a condition that the upper tape width is smaller than the object area length. The second condition includes: a condition that the object area width is smaller than or equal to the object area length; and a condition that the object area length is smaller than or equal to the upper tape width. The third condition includes: a condition that the object area length is smaller than the object area width; and a condition that the object area width is smaller than or equal to the upper tape width. The fourth condition includes: a condition that the object area length is smaller than or equal to the upper tape width; and a condition that the upper tape width is smaller than the object area width.

According to still another aspect, the present disclosure provides a print control device for performing a print control for printing one or more objects on an upper tape to be affixed to a lower tape. The print control device includes a controller configured to perform: (a) editing an image constituted by one or more objects including: one or more lower objects to be printed on the lower tape; and one or more upper objects to be printed on the upper tape; (b) acquiring: an image area length that is a length of an image area in a longitudinal direction of the lower tape, the image area being an area occupied by a rectangle surrounding the image edited in (a); an image area width that is a length of the image area in a width direction of the lower tape; a lower tape length that is a length of the lower tape in the longitudinal direction; and a lower tape width that is a length of the lower tape in the width direction; (c) designating one upper object from among the one or more upper objects; (d) acquiring: an object area length that is a length of an object area in the longitudinal direction, the object area being an area occupied by a rectangle surrounding the one upper object designated in (c); and an object area width that is a length of the object area in the width direction; (e) acquiring an upper tape width that is a length of the upper tape in a width direction of the upper tape; (f) when a precondition and a first condition are both met, (f1) setting an orientation to a parallel orientation, the orientation being a direction in which the upper tape is disposed relative to the one or more lower objects disposed on the lower tape, the parallel orientation being an orientation in which a longitudinal direction of the upper tape is made to coincide with the longitudinal direction of the lower tape; and (f2) setting an upper tape length to the object area length acquired in (d), the upper tape length being a length of the upper tape in the longitudinal direction of the upper tape; (g) when the precondition and a second condition are both met, (g1) setting the orientation to an orthogonal orientation, the orthogonal orientation being an orientation in which the longitudinal direction of the upper tape is made to coincide with the width direction of the lower tape; and (g2) setting the upper tape length to the object area width acquired in (d); (h) when the precondition and a third condition are both met, (h1) setting the orientation to the parallel orientation; and (h2) setting the upper tape length to the object area length acquired in (d); (i) when the precondition and a fourth condition are both met, (i1) setting the orientation to the orthogonal orientation; and (i2) setting the upper tape length to the object area width acquired in (d); (j) when the precondition and a fifth condition are both met, (j1) setting the orientation to the parallel orientation; and (j2) setting the upper tape length to the object area length acquired in (d); (k) when the precondition and a sixth condition are both met, (k1) setting the orientation to the orthogonal orientation; and (k2) setting the upper tape length to the object area width acquired in (d); (l) issuing, when the precondition is met and all of the first condition, the second condition, the third condition, the fourth condition, the fifth condition, and the sixth condition are not met, an error notification; and (m) executing the print control on the basis of the orientation and the upper tape length which are set in any one of (f), (g), (h), (i), (j) and (k). The precondition includes: a condition that the image area length is smaller or equal to the lower tape length; and a condition that the image area width is smaller or equal to the lower tape width. The first condition includes: a condition that the object area width is smaller than the upper tape width; a condition that the upper tape width is smaller than the object area length; and a condition that the upper tape width is smaller than or equal to the lower tape width. The second condition includes: a condition that the object area width is smaller than or equal to the object area length; a condition that the object area length is smaller than or equal to the upper tape width; and a condition that the upper tape width is smaller than or equal to the lower tape length. The third condition includes: a condition that the object area length is smaller than the object area width; a condition that the object area width is smaller than or equal to the upper tape width; and a condition that the upper tape width is smaller than or equal to the lower tape width. The fourth condition includes: a condition that the object area length is smaller than or equal to the upper tape width; a condition that the upper tape width is smaller than the object area width; and a condition that the upper tape width is smaller than or equal to the lower tape length. The fifth condition includes: a condition that the object area width is smaller than or equal to the object area length; a condition that the object area length is smaller than or equal to the upper tape width; a condition that the upper tape width is smaller than or equal to the lower tape width; and a condition that the lower tape length is smaller than the upper tape width. The sixth condition includes: a condition that the object area length is smaller than the object area width; a condition that the object area width is smaller than or equal to the upper tape width; a condition that the upper tape width is smaller than or equal to the lower tape length; and a condition that the lower tape width is smaller than the upper tape width.

BRIEF DESCRIPTION OF THE DRAWINGS

The particular features and advantages of the disclosure as well as other objects will become apparent from the following description taken in connection with the accompanying drawings, in which:

FIG. 1 is a perspective view of a printing system 1;

FIG. 5A is a view for describing a fifth condition;

FIG. 5B is a view for describing a sixth condition;

FIG. 6A is a view for describing a first error condition;

FIG. 6B is a view for describing a second error condition;

FIG. 6C is a view for describing a third error condition;

FIG. 6D is a view for describing a fourth error condition;

FIG. 6E is a view for describing a fifth error condition;

FIG. 15 is a view for describing how to set an upper tape length L8 in a modification of the embodiment.

DETAILED DESCRIPTION

Figure 2:
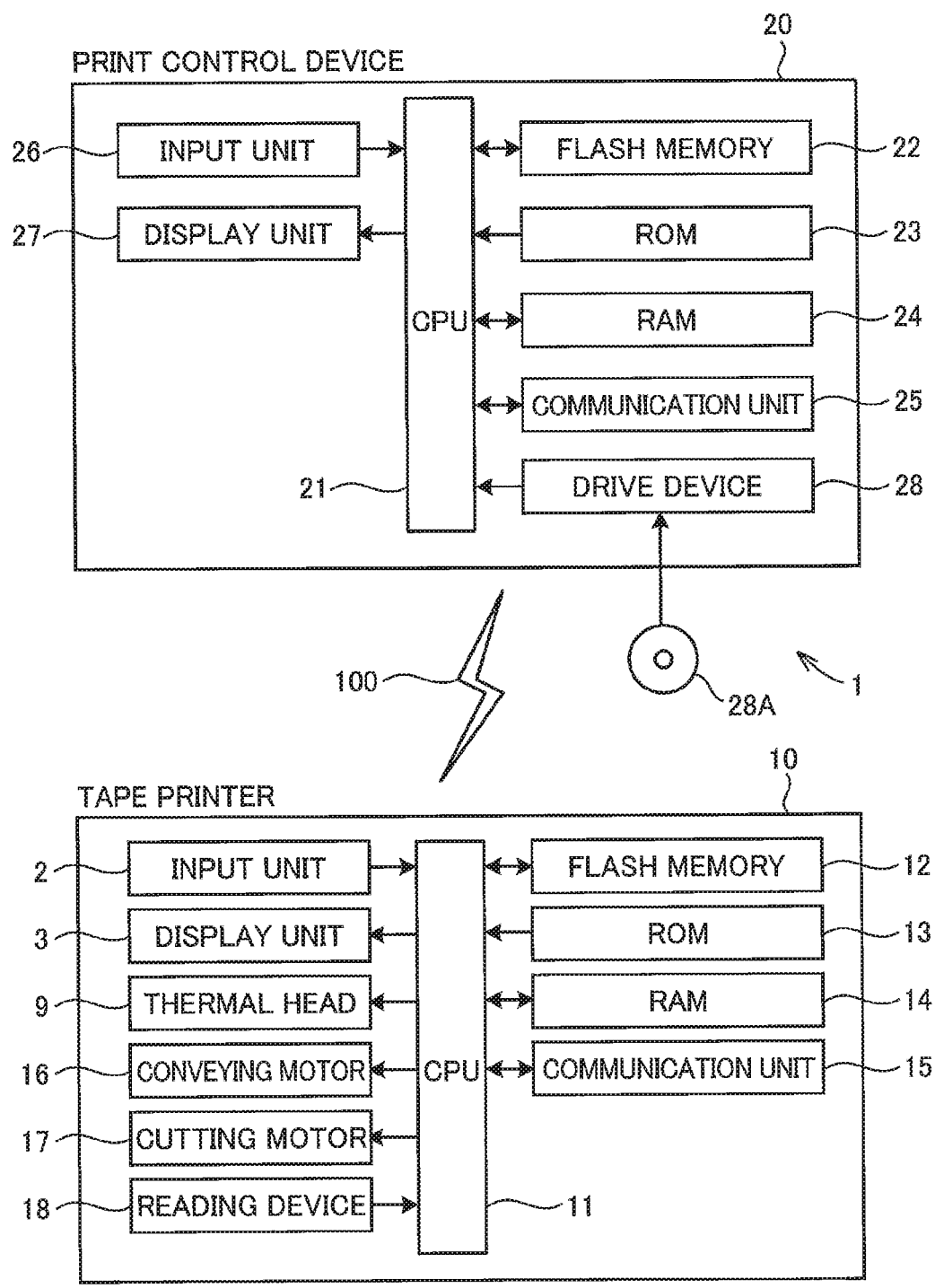
FIG. 2 is a block diagram illustrating an electrical configuration of the printing system 1.

A printing system 1 according to one embodiment of the present disclosure will be described while referring to the accompanying drawings. The referenced drawings are used to describe the technical features that can be employed in the present disclosure. The configurations of the apparatuses described in the drawings are merely examples, and the present disclosure is not intended to be limited to these configurations.

First, an overview of the printing system 1 will be given with reference to FIG. 1. The printing system 1 includes a print control device 20, and a tape printer 10. The print control device 20 is a common personal computer. The print control device 20 can communicate with the tape printer 10 over a network 100. The tape printer 10 performs printing operations to print objects on a tape 40 based on the print control performed by the print control device 20. Objects may include characters, graphics, symbols, and the like.

Here, the general structure of the tape printer 10 will be described while referring to FIG. 1. In the following description, the upper-left side, lower-right side, lower-left side, upper-right side, top side, and bottom side in FIG. 1 will define the corresponding left side, right side, front side, rear side, top side, and bottom side of the tape printer 10 and a tape cassette 30.

The tape printer 10 is provided with an input unit 2, a display unit 3, a cover 4, and a cassette mounting section 5. The input unit 2 is provided in the top surface of the tape printer 10. The user operates the input unit 2 in order to input various information into the tape printer 10. The display unit 3 is provided to the rear of the input unit 2. The display unit 3 displays various types of information. The cover 4 is provided on the rear side of the display unit 3 and can open and close over the cassette mounting section 5.

The cassette mounting section 5 is positioned rearward of the display unit 3. The tape cassette 30 is detachably attached to the cassette mounting section 5. The tape cassette 30 has a cassette case 31. A tape 40 and an ink ribbon (not illustrated) are accommodated inside the cassette case 31. The tape 40 has an elongated shape and is formed by laminating a base material, an adhesive layer, and a release paper in this order. The surface of the base material on the side opposite to the release paper serves as a print surface on which an object is to be printed using the ink ribbon. The cassette case 31 has an identification part 32 on its front surface. The identification part 32 is constituted by a combination of plane portions and recessed portions and is formed in a pattern according to the color of the ink ribbon (i.e., the color of an object to be printed on the tape 40) and the length of the tape 40 in the width direction (hereinafter referred to as "tape width"). That is, the arrangement pattern of the plane portions and recessed portions of the identification part 32 differs depending on the color of the ink ribbon and the tape width of the tape 40 which are accommodated in the cassette case 31 of the tape cassette 30.

The cassette mounting section 5 is provided with a ribbon take-up shaft 6, a tape drive shaft 7, and a thermal head 9 (see FIG. 2). By drive of a conveying motor 16 (see FIG. 2), the ribbon take-up shaft 6 takes up a used part of the ink ribbon and conveys an unused part of the ink ribbon. Also, by the drive of the conveying motor 16 (see FIG. 2), the tape drive shaft 7 conveys the tape 40. The thermal head 9 generates heat to print an object on the tape 40 using the ink ribbon. A cutting part 8 is provided on the left side of the tape drive shaft 7. By drive of a cutting motor 17 (see FIG. 2), the cutting part 8 cuts the tape 40 having an object printed thereon. In such a manner, a label is created.

In the present embodiment, the tape 40 is classified into a lower tape 41 and an upper tape 42 (see FIGS. 4A-4D). The lower tape 41 is a so-called normal tape having an opaque base material. The upper tape 42 is a so-called clear tape having a transparent or translucent base material.

A label created by cutting the lower tape 41 having an object printed thereon is referred to as "lower label" (not illustrated). A label created by cutting the upper tape 42 having an object printed thereon is referred to as "upper label 43" (see FIGS. 4A-4D). The lower label serves as a base. The upper label 43 is affixed to the print surface of the lower label. For example, a user can create a so-called multi-colored label that appears as if an object having a plurality of colors were printed on a single tape 40 by attaching the upper label 43 to the print surface of the lower label. Thus, the print control device 20 can easily create a multi-colored label by attaching a plurality of labels to each other without the need of complicated control and structure for printing an object having a plurality of colors on a single label.

Next, the electrical configuration of the tape printer 10 will be described with reference to FIG. 2. The tape printer 10 has a CPU 11. The CPU 11 functions as a processor for controlling the tape printer 10. The CPU 11 is electrically connected to a flash memory 12, a ROM 13, a RAM 14, a communication unit 15, the input unit 2, the display unit 3, the thermal head 9, the conveying motor 16, the cutting motor 17, and a reading device 18.

The flash memory 12 stores therein programs executed by the CPU 11 and the like. The ROM 13 stores therein various parameters that the CPU 11 requires when executing the various programs. The RAM 14 stores therein various temporary data, such as print control information received from the editing device 20. The communication unit 15 is a controller for communicating with the editing device 20 via the network 100. The reading device 18 is a sensor for reading cassette information from the identification part 32.

The following describes the electrical configuration of the print control device 20. The print control device 20 has a CPU 21. The CPU 21 functions as a processor for controlling the print control device 20. The CPU 21 is electrically connected to a flash memory 22, a ROM 23, a RAM 24, a communication unit 25, an input unit 26, a display unit 27, and a drive device 28.

The flash memory 22 stores therein various programs executed by the CPU 21, label data, and the like. The RAM 24 stores therein various temporary data. The ROM 23 stores therein various types of information (e.g., information indicating a precondition and first to sixth conditions to be described later) that the CPU 21 requires when executing the various programs.

The communication unit 25 is a controller for communication with the tape printer 10 over the network 100. The input unit 26 inputs various types of information to the print control device 20 according to user operations. The display unit 27 displays various types of information. The drive device 28 can read out information stored in a storage medium 28A. The storage medium 28A is, e.g., a semiconductor memory, an optical disk, or the like. The CPU 21 can read out a main program stored in the storage medium 28A using the drive device 28 and store the read out main program in the flash memory 22.

Figure 3:
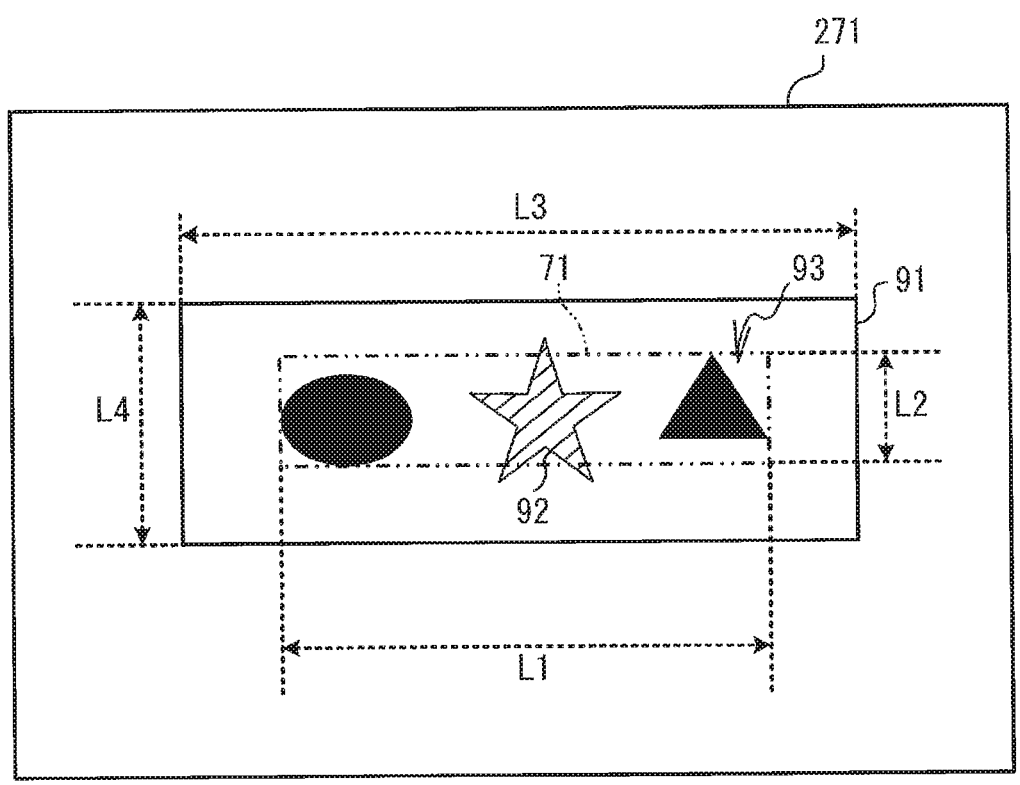
FIG. 3 is a view illustrating an editing screen 271.

The following describes an editing screen 271 with reference to FIG. 3. The print control device 20 can edit image information on the editing screen 271. The edit image information represents an image composed of one or more objects. More precisely, on the editing screen 271, the print control device 20 can edit label data for creating the lower label and the upper label 43. The image information is included in the label data. On the editing screen 271, a printing result (i.e., a print preview) of a multi-colored label created by the tape printer 10 is displayed based on an editing result of the label data. Specifically, a lower label image 91, a lower image 92, and an upper image 93 are displayed on the editing screen 271.

The lower label image 91 represents the size (outer shape) of the lower label. The lower image 92 is an image (hereinafter, referred to as "lower image") to be printed on the lower tape 41 and represents, in the example of FIG. 3, the shaded "☆" (i.e., a star shape) as a single object. The upper image 93 is an image (hereinafter, referred to as "upper image") to be printed on the upper tape 42 and represents, in the example of FIG. 3, the black "• ▲" (i.e., a black circle and a black triangle) as two objects. The shading of the lower image "☆" indicates that the color of the lower image differs from the color (black) of the upper image. The print control device 20 can edit, on the editing screen 271, the label data according to user operations to the input unit 26 in a state where both the lower image 92 and the upper image 93 are superimposed on the lower label image 91.

After editing the label data, the print control device 20 transmits, when a precondition (to be described later) is met and any one of first to sixth conditions (to be described later) is met, print control information according to the edited label data to the tape printer 10. The tape printer 10 executes print operations based on the print control information transmitted from the print control device 20 to create the labels.

The precondition will be described while referring to FIG. 3. Hereinafter, the length of the lower label in the longitudinal direction thereof, i.e., the longitudinal direction length of the lower tape 41 for which print control is to be executed is referred to as "lower tape length L3". The length of the lower label in the width direction thereof, i.e., the tape width of the lower tape 41 is referred to as "lower tape width L4".

In a case where the upper image is disposed on the lower tape 41, the minimum rectangle surrounding the upper image (i.e., an area occupied by the minimum rectangle surrounding the upper image) is referred to as "image area 71", the length of the image area 71 in the longitudinal direction of the lower tape 41 is referred to as "image area length L1", and the length of the image area 71 in the width direction of the lower tape 41 is referred to as "image area width L2". More specifically, the image area 71 is defined such that a pair of line segments parallel to the longitudinal direction of the lower tape 41 pass both ends of the upper image in the width direction of the lower tape 41 and a pair of line segments parallel to the width direction of the lower tape 41 pass both ends of the upper image in the longitudinal direction of the lower tape 41. That is, the image area 71 is not inclined with respect to the lower tape 41.

After editing the label data, the print control device 20 determines, based on the image area 71, whether the precondition is satisfied. The precondition includes the following two conditions (that is, the precondition is met when the following two conditions are both met):

image area length L1≤lower tape length L3.
image area width L2≤lower tape width L4.

In a case where the precondition is not met, the upper image runs off the lower label when the upper label 43 is affixed to the lower label. In this case, the print control device 20 does not perform printing. More precisely, when the precondition is not met, the print control device 20 displays on the display unit 27 an upper image error massage (not illustrated) to be described later. On the other hand, when the precondition is satisfied, the print control device 20 designates one or more objects or all objects (hereinafter, referred to as "print object") from among the one or more objects constituting the upper image.

The following describes first to sixth conditions with reference to FIGS. 4A to 4D and FIGS. 5A to 5B. It is assumed hereinafter that "•" is designated as the print object. In FIG. 4A to 4D, the shape of the "•" of the print object has been appropriately changed with the assumption that the precondition is met (the same applies to FIGS. 6A to 6E). Further, FIGS. 4A to 4D and FIGS. 5A to 5B indicate, on their left side, a state in which the object "•" is virtually disposed on the lower tape 41, not a state in which the object "•" is actually printed on the lower tape 41. The same is true with respect to FIGS. 6A to 6E.

Hereinafter, in a case where the print object ("•" in the example of FIGS. 4A to 4D) is disposed on the lower tape 41, the minimum rectangle surrounding the print object (i.e., an area occupied by the minimum rectangle surrounding the print object) is referred to as "object area 75", the length of the object area 75 in the longitudinal direction of the lower tape 41 is referred to as "object area length L5", and the length of the object area 75 in the width direction of the lower tape 41 is referred to as "object area width L6". More precisely, the object area 75 is defined such that a pair of line segments parallel to the longitudinal direction of the lower tape 41 pass both ends of the print object in the width direction of the lower tape 41 and a pair of line segments parallel to the width direction of the lower tape 41 pass both ends of the print object in the longitudinal direction of the lower tape 41. That is, the object area 75 is not inclined with respect to the lower tape 41.

The length of the upper label in the longitudinal direction thereof, i.e., the longitudinal direction length of the upper tape 42 for which print control is to be executed is referred to as "upper tape length L8". The length of the upper label in the width direction thereof, i.e., the tape width of the upper tape 42 is referred to as "upper tape width L7". The direction in which the upper tape 42 is disposed relative to the print object disposed on the lower tape 41 is referred to as "orientation". An orientation in which the longitudinal direction of the upper tape 42 is made to coincide with the longitudinal direction of the lower tape 41 is referred to as "parallel orientation". An orientation in which the longitudinal direction of the upper tape 42 is made to coincide with the width direction of the lower tape 41 is referred to as "orthogonal orientation".

The print control device 20 determines, based on the object area 75, whether any one of the first to sixth conditions is met. When any one of the first to sixth conditions is satisfied, the print control device 20 can set the orientation to either the parallel orientation or orthogonal orientation and can set the upper tape length L8 to either the object area length L5 or object area width L6.

Figure 4A:
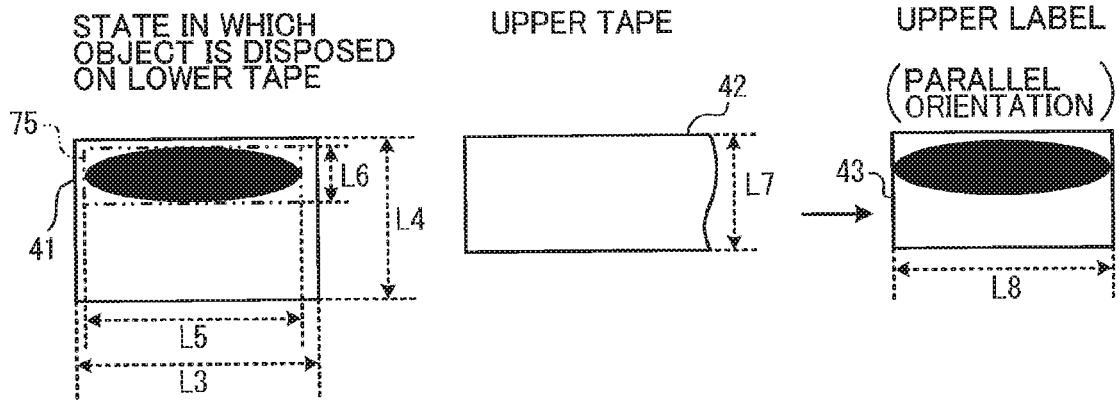
FIG. 4A is a view for describing a first condition.

When the first condition is met as illustrated in FIG. 4A, the print control device 20 sets the orientation to the parallel orientation and sets the upper tape length L8 to the object area length L5. The first condition includes the following three conditions (that is, the first condition is met when the following three conditions are all met):
 object area width L6<upper tape width L7.
 upper tape width L7<object area length L5.
 upper tape width L7≤lower tape width L4.

Figure 4B:
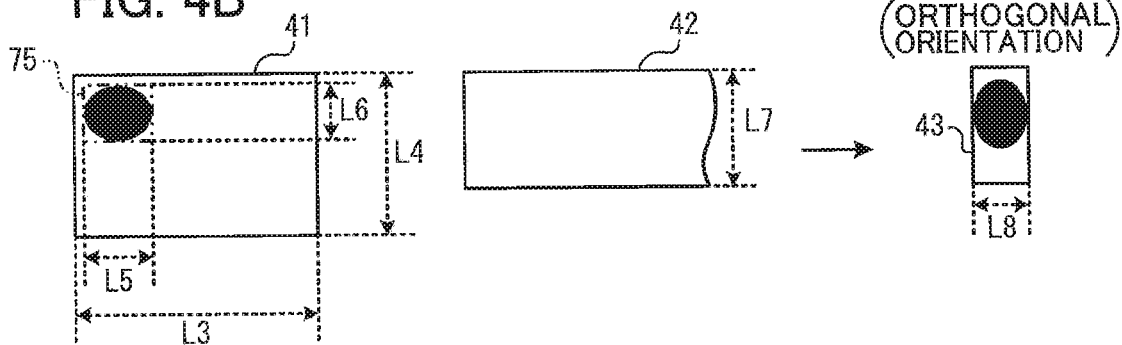
FIG. 4B is a view for describing a second condition.

When the second condition is met as illustrated in FIG. 4B, the print control device 20 sets the orientation to the orthogonal orientation and sets the upper tape length L8 to the object area width L6. The second condition includes the following four conditions (that is, the second condition is met when the following four conditions are all met):
 object area length L5≤upper tape width L7.
 object area width L6≤upper tape width L7.
 object area width L6≤object area length L5.
 upper tape width L7≤lower tape length L3.

Figure 4C:
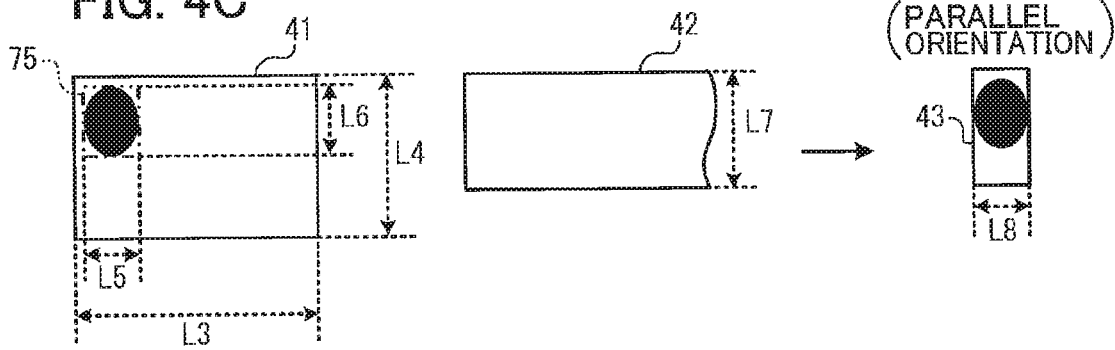
FIG. 4C is a view for describing a third condition.

When the third condition is satisfied as illustrated in FIG. 4C, the print control device 20 sets the orientation to the parallel orientation and sets the upper tape length L8 to the object area length L5. The third condition includes the following four conditions (that is, the third condition is met when the following four conditions are all met):
 object area length L5≤upper tape width L7.
 object area width L6≤upper tape width L7.
 object area length L5≤object area width L6.
 upper tape width L7≤lower tape width L4.

Figure 4D:
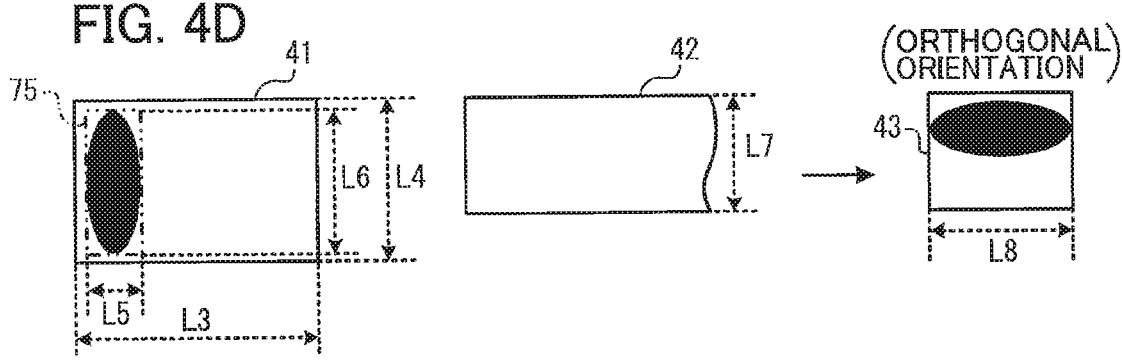
FIG. 4D is a view for describing a fourth condition.

When the fourth condition is met as illustrated in FIG. 4D, the print control device 20 sets the orientation to the orthogonal orientation and sets the upper tape length L8 to the object area width L6. The fourth condition includes the following three conditions (that is, the fourth condition is met when the following three conditions are all met):
 object area length L5≤upper tape width L7.
 upper tape width L7<object area width L6.
 upper tape width L7≤lower tape length L3.

When the fifth condition is met as illustrated in FIG. 5A, the print control device 20 sets the orientation to the parallel orientation and sets the upper tape length L8 to the object area length L5. The fifth condition includes the following five conditions (that is, the fifth condition is met when the following five conditions are all met):
 object area length L5≤upper tape width L7.
 object area width L6≤upper tape width L7.
 object area width L6≤object area length L5.
 lower tape length L3<upper tape width L7.
 upper tape width L7≤lower tape width L4.

When the sixth condition is met as illustrated in FIG. 5B, the print control device 20 sets the orientation to the orthogonal orientation and sets the upper tape length L8 to the object area width L6. The sixth condition includes the following five conditions (that is, the sixth condition is met when the following five conditions are all met):
 object area length L5≤upper tape width L7.
 object area width L6≤upper tape width L7.
 object area length L5<object area width L6.
 lower tape width L4<upper tape width L7.
 upper tape width L7≤lower tape length L3.

The print control device 20 transmits the print object and print control information indicating the set orientation and the set upper tape length L8 to the tape printer 10 over the network 100. Based on the received print control information, the tape printer 10 performs print control for the upper tape 42. More precisely, the tape printer 10 controls the conveying motor 16 to convey the upper tape 42 by a length corresponding to the set upper tape length L8 and, at the same time, controls the thermal head 9 to print the upper image onto the upper tape 42 according to the set orientation. The tape printer 10 then controls the cutting motor 17 to cut the upper tape 42. As a result, the upper label 43 whose length is the upper tape length L8 and on which the upper image has been printed in the set orientation, is created.

The following describes first to fifth error conditions with reference to FIGS. 6A to 6E. When none of the above first to sixth conditions is met as illustrated in FIGS. 6A to 6E, the print control device 20 sets neither the orientation nor the upper tape length L8 as an error operation. More precisely, when none of the first to sixth conditions is met, the print control device 20 displays a third cassette replacement message 272 (described later, see FIG. 14) on the display unit 27. When none of the first to sixth conditions is satisfied, any one of the following first to fifth error conditions is satisfied.

The first error condition includes the following three conditions (that is, the first error condition is met when the following three conditions are all met):
 object area width L6<upper tape width L7.
 upper tape width L7<object area length L5.
 lower tape width L4<upper tape width L7.

As illustrated in FIG. 6A, in a case where the first error condition is satisfied, setting the orientation to the parallel orientation allows the tape printer 10 to print the entire print object on the upper tape 42 and thereby to create the upper label 43. However, when the created upper label 43 is affixed to the lower label, the upper label 43 runs off the lower label in the width direction, resulting in an error.

The second error condition includes the following five conditions (that is, the second error condition is met when the following five conditions are all met):
 object area length L5≤upper tape width L7.
 object area width L6≤upper tape width L7.
 object area width L6≤object area length L5.
 lower tape length L3<upper tape width L7.
 lower tape width L4<upper tape width L7.

As illustrated in FIG. 6B, in a case where the second error condition is satisfied, the tape printer 10 can print the entire print object on the upper tape 42 even in either the parallel orientation or the orthogonal orientation. Therefore, also in this case, the tape printer 10 can create the upper label 43. However, when the created upper label 43 is affixed to the lower label, the upper label 43 runs off the lower label in the longitudinal direction or width direction, resulting in an error.

The third error condition includes the following five conditions (that is, the third error condition is met when the following five conditions are all met):
object area length L5≤upper tape width L7.
object area width L6≤upper tape width L7.
object area length L5≤object area width L6.
lower tape width L4<upper tape width L7.
lower tape length L3<upper tape width L7.

As illustrated in FIG. 6C, in a case where the third error condition is satisfied, the tape printer 10 can print the entire print object on the upper tape 42 even in either the parallel orientation or the orthogonal orientation. Accordingly, also in this case, the tape printer 10 can create the upper label 43. However, when the created upper label 43 is affixed to the lower label, the upper label 43 runs off the lower label in the longitudinal direction or width direction, resulting in an error.

The fourth error condition includes the following three conditions (that is, the fourth error condition is met when the following three conditions are all met):
object area length L5≤upper tape width L7.
upper tape width L7<object area width L6.
lower tape length L3<upper tape width L7.

As illustrated in FIG. 6D, in a case where the fourth error condition is satisfied, setting the orientation to the orthogonal orientation allows the tape printer 10 to print the entire print object on the upper tape 42 and thereby to create the upper label 43. However, when the created upper label 43 is affixed to the lower label, the upper label 43 runs off the lower label in the longitudinal direction, resulting in an error.

The fifth error condition includes the following two conditions (that is, the fifth error condition is met when the following two conditions are both met):
upper tape width L7<object area length L5.
upper tape width L7<object area width L6.

As illustrated in FIG. 6E, when the fifth error condition is satisfied, the print object runs off the upper tape 42. That is, the entire print object cannot be printed on the upper tape 42, resulting in an error.

The following describes main process with reference to FIGS. 7 to 13. When an instruction for starting the main process is inputted through the input unit 26, the CPU 21 executes the main program to start the main process.

Figure 7:
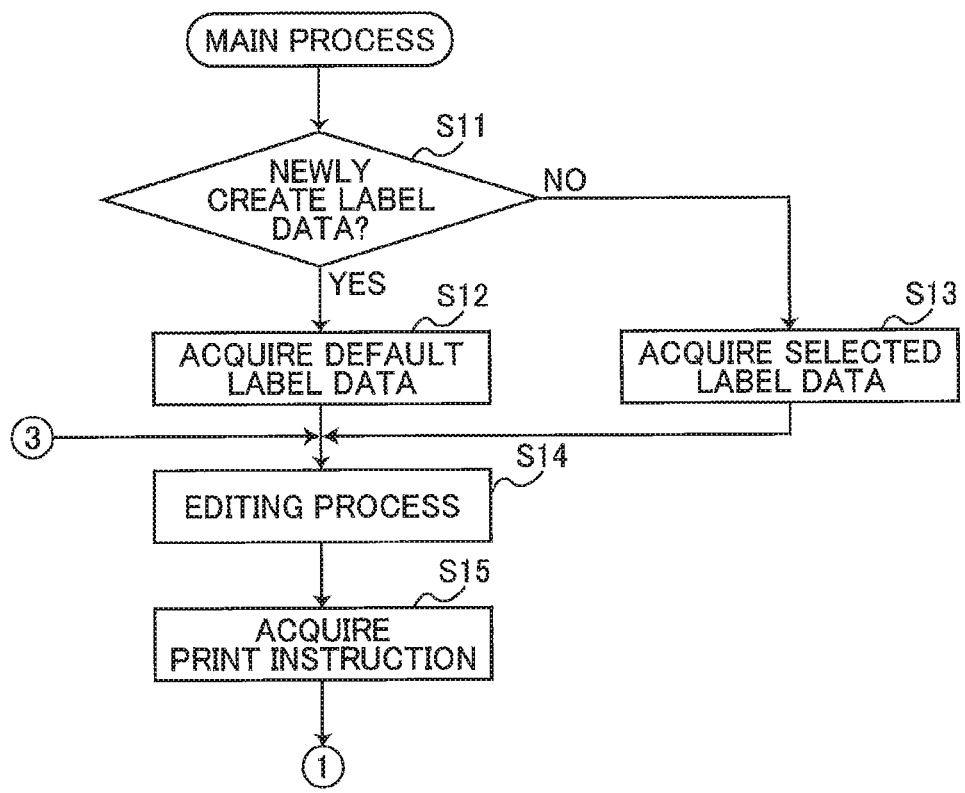
FIG. 7 is a first part of a flowchart illustrating a main process.

As illustrated in FIG. 7, in response to a predetermined user operation to the input unit 26, the CPU 21 determines whether to newly create label data (S11). The user operates the input unit 26 to select either creation of new label data or editing of existing label data. Note that, when the user has selected editing of the existing label data, the user operates the input unit 26 to select label data to be edited from among one or more existing label data.

When the user has selected creation of new label data (YES in S11), the CPU 21 acquires default label data from the flash memory 22 (S12). The CPU 21 then stores the acquired default label data in the RAM 24. When the user has selected editing of existing label data (NO in S11), the CPU 21 acquires user-selected label data from the flash memory 22 (S13). The CPU 21 then stores the acquired label data in the RAM 24.

The label data includes lower image information, upper image information, lower image color information, upper image color information, lower tape information, image area information, and object area information.

The lower image information is image information indicating the content of the lower image. More specifically, the lower image information indicates the shape of each of one or more objects constituting the lower image and arrangement of the objects. The upper image information is image information indicating the content of the upper image. More specifically, the upper image information indicates the shape of each of one or more objects (hereinafter, referred to as "upper object") constituting the upper image and arrangement of the upper objects.

The lower image color information is image information indicating the color of the lower image. The upper image color information is image information indicating the color of the upper image. The lower tape information indicates the lower tape length L3 and the lower tape width IA. The image area information indicates the image area length L1 and the image area width L2. The object area information indicates the object area length L5 and the object area width L6 of each upper object.

The CPU 21 executes an editing process (S14). On the basis of the label data stored in the RAM 24 in S12 or S13, the CPU 21 displays on the display unit 27 the editing screen 271 (see FIG. 3) for creating a multi-colored label. The user operates the input unit 26 to edit, on the editing screen 271, the content and color of the lower image and the size of each object therein, the content and color of the upper image and the size of each object therein, and the size of the lower tape 41. The CPU 21 edits, on the RAM 24, the label data in accordance with the user operation to the input unit 26.

After completion of editing of the label data, the user operates the input unit 26 to input, to the print control device 20, a print instruction for making the tape printer 10 execute print operation. The CPU 21 acquires the print instruction inputted by the user (S15).

Figure 8:
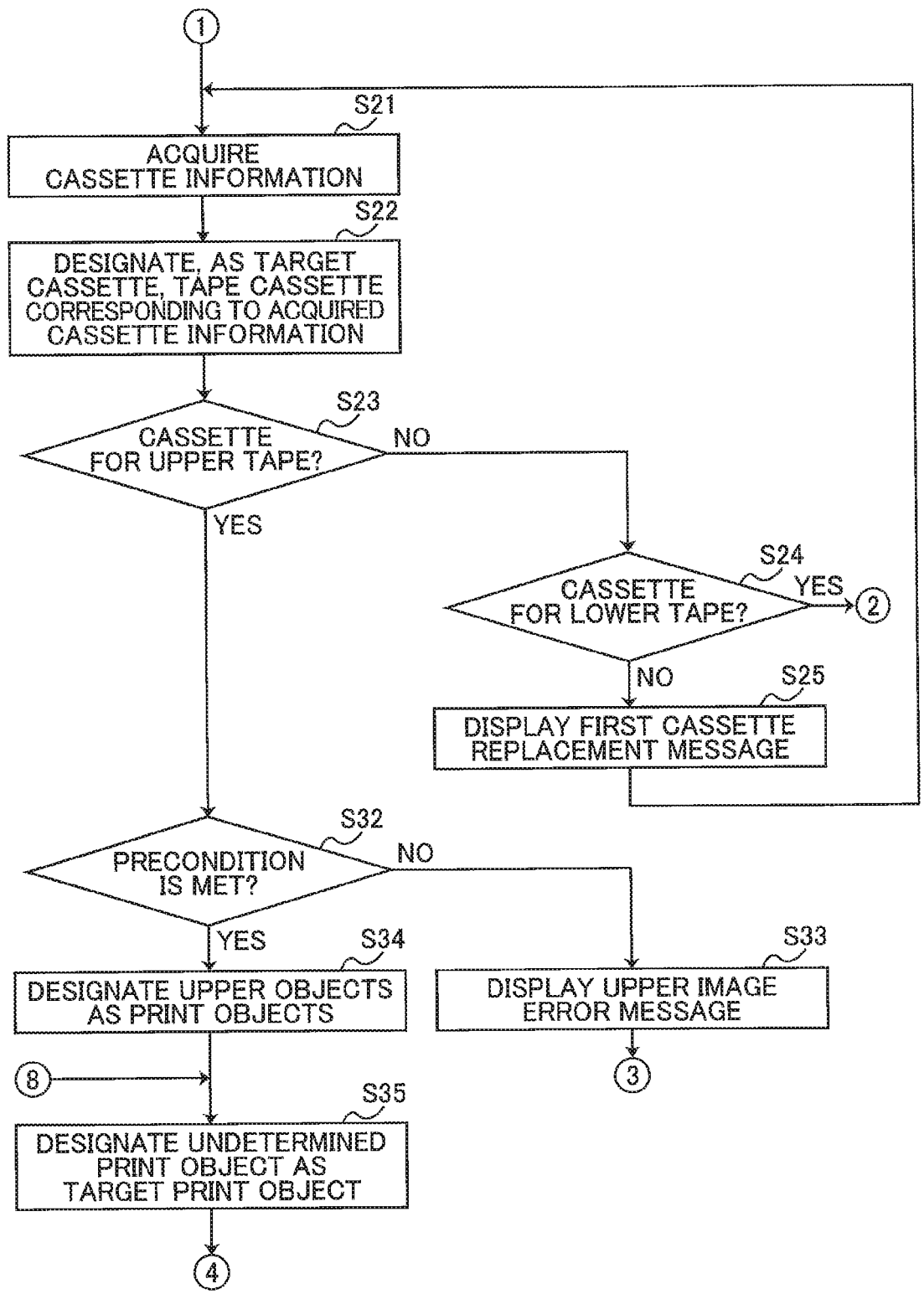
FIG. 8 is a second part of the flowchart illustrating the main process.

As illustrated in FIG. 8, the CPU 21 acquires cassette information (S21). More precisely, the CPU 21 transmits, to the tape printer 10 over the network 100, a cassette information transmission instruction for instructing the tape printer 10 to transmit the cassette information. In the tape printer 10, upon receipt of the cassette information transmission instruction over the network 100, the CPU 11 reads out the cassette information from the identification part 32 (see FIG. 1) through the reading device 18 (see FIG. 2). The CPU 11 transmits the read-out cassette information to the print control device 20 over the network 100.

In the print control device 20, the CPU 21 acquires (i.e., receives) the transmitted cassette information from the tape printer 10 over the network 100. The CPU 21 stores the acquired cassette information in the RAM 24. The cassette information indicates the color and tape width of the ink ribbon of the tape cassette 30. The CPU 21 designates, on the RAM 24, the tape cassette 30 corresponding to the acquired cassette information as a target cassette (S22).

The CPU 21 determines, based on the upper image color information edited in S14 (see FIG. 7) and the cassette information acquired in S21, whether the target cassette is a cassette for the upper tape (S23). The cassette for the upper tape (hereinafter, referred to as "upper tape cassette") is the tape cassette 30 which accommodates therein the upper tape 42.

When the color of the ink ribbon indicated by the cassette information corresponding to the target cassette differs from the color of the upper image indicated by the upper image color information, the CPU 21 determines that the target cassette is not the upper tape cassette (NO in S23). In this case, the CPU 21 determines, based on the lower image color information edited in S14 (see FIG. 7), the lower tape information, and the cassette information acquired in S21, whether the target cassette is a cassette for the lower tape (S24). The cassette for the lower tape (hereinafter, referred to as "lower tape cassette") is the tape cassette 30 which accommodates therein the lower tape 41.

In both a case where the color of the ink ribbon indicated by the cassette information corresponding to the target cassette differs from the color of the lower image indicated by the lower image color information and a case where the tape width indicated by the cassette information corresponding to the target cassette differs from the lower tape width L4 indicated by the lower tape information, the CPU 21 determines that the target cassette is not the lower tape cassette (NO in S24).

In this case, the CPU 21 displays a first cassette replacement message (not illustrated) on the display unit 27 (S25). The first cassette replacement message says, e.g., "the tape cassette currently attached is suitable for neither the upper tape cassette nor the lower tape cassette, so please replace the attached tape cassette with another one". Thus, the first cassette replacement message indicates that the tape cassette 30 currently attached to the cassette mounting section 5 is suitable for neither the upper tape cassette nor lower tape cassette and prompts the user to replace the tape cassette 30 currently attached to the cassette mounting section 5 with another tape cassette 30.

The CPU 21 returns to S21. When the user has checked the first cassette replacement message displayed on the display unit 27, the user replaces the tape cassette 30 currently attached to the cassette mounting section 5 with another tape cassette 30. In 821, the CPU 21 acquires the cassette information corresponding to the newly attached tape cassette 30 (S21). The CPU 21 performs the above-described process from S22 on the basis of the cassette information corresponding to the newly attached tape cassette 30.

When the color of the ink ribbon indicated by the cassette information corresponding to the target cassette coincides with the color of the lower image indicated by the lower image color information and the tape width indicated by the cassette information corresponding to the target cassette coincides with the lower tape width L4 indicated by the lower tape information, the CPU 21 determines that the target cassette is the lower tape cassette (YES in S24). In this case, the CPU 21 shifts to S101 (see FIG. 13).

When the color of the ink ribbon indicated by the cassette information corresponding to the target cassette coincides with the color of the upper image indicated by the upper image color information, the CPU 21 determines that the target cassette is the upper tape cassette (YES in S23). In this case, the CPU 21 determines whether the precondition is met for the upper image (S32). More specifically, the CPU 21 refers to the RAM 24 to determine, based on the image area information edited in S14 (see FIG. 7) and the lower tape information, whether the following two conditions are both satisfied:

image area length L1≤lower tape length L3.
image area width L2≤lower tape width L4.

When the precondition is not satisfied (NO in S32), the CPU 21 displays an upper image error message (not illustrated) on the display unit 27 (S33). The upper image error message says, e.g., "the image to be printed on the upper tape runs off the lower tape, so please edit the image to be printed on the upper tape". The upper image error message prompts the user to reedit the upper image so that the upper image falls within the range of the lower label in both its longitudinal and width directions. Thus, the upper image can be prevented from running off the lower label when the upper label is affixed to the lower label. Then, the CPU 21 returns to S14 (see FIG. 7).

When the precondition is met (YES in S32), the CPU 21 designates, on the RAM 24, all the upper objects indicated by the upper image information (S34) as a print object. In the example of FIG. 3, "●" and "▲" that are the upper objects are designated as the print objects. If there are one or more undetermined print objects among the print objects designated is S34, the CPU 21 designates, as a target print object, one undetermined print object from among the one or more undetermined print object (S35). The undetermined print object is the print object for which determination has not yet been made as to whether any one of the first to sixth conditions is met. The target print object is the print object to be targeted for determination as to whether any one of the first to sixth conditions is met. For example, "e" which is one of the upper objects is designated as the target print object.

Figure 9:
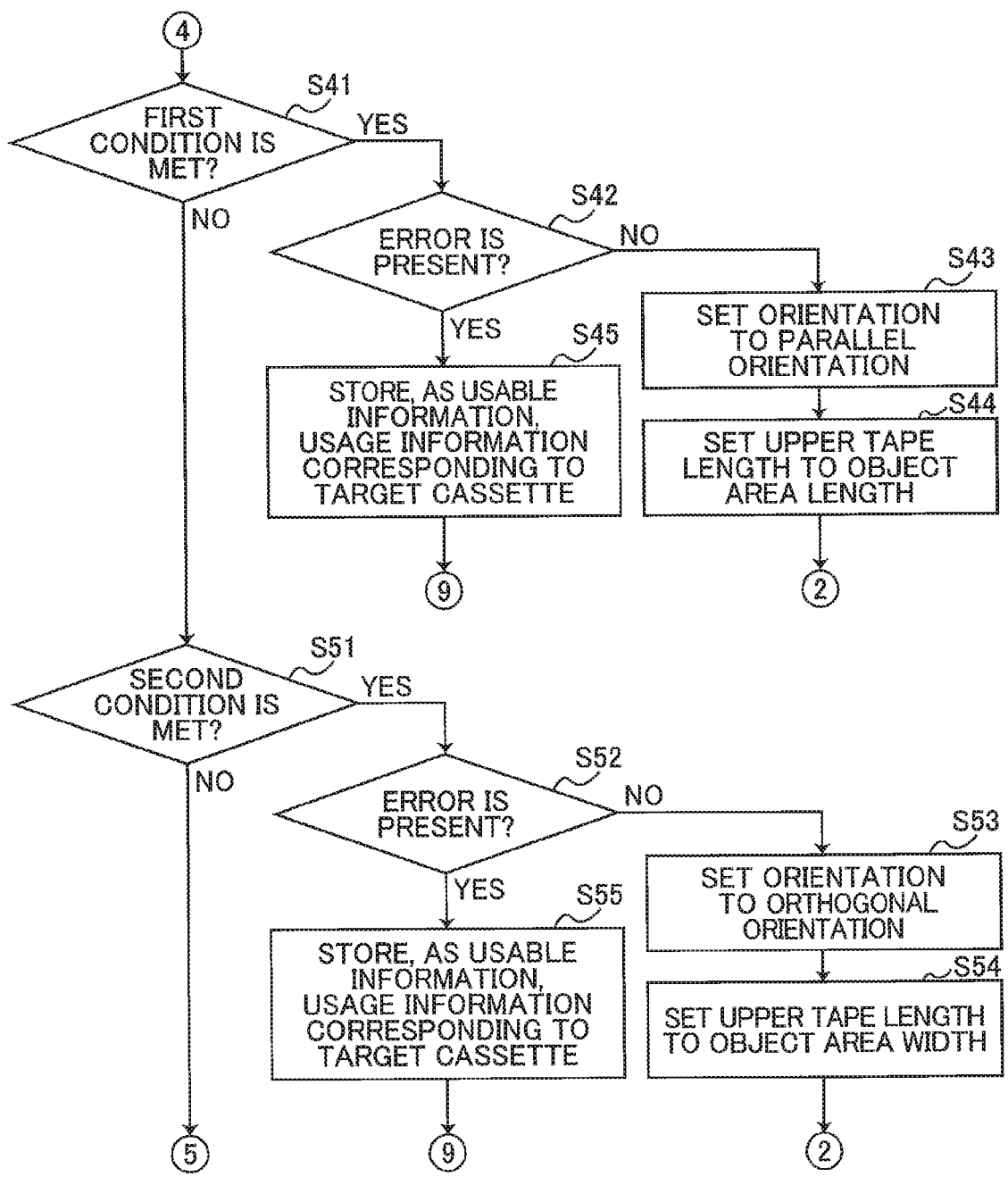
FIG. 9 is a third part of the flowchart illustrating the main process.

As illustrated in FIG. 9, the CPU 21 determines whether the first condition is met for the target print object (S41). More precisely, the CPU 21 determines, based on the object area information edited in S14 (see FIG. 7), the lower tape information, the cassette information corresponding to the target cassette, whether the following three conditions are all satisfied:

object area width L6<upper tape width L7.
upper tape width L7<object area length L5.
upper tape width L7≤lower tape width L4.

When the first condition is satisfied as in the example illustrated in FIG. 4A (YES in S41), the CPU 21 determines, based on an error flag, whether an error is occurring (S42). The error flag is stored in the RAM 24 and indicates whether or not an error is occurring. The error flag is set to "ON" when an error occurs for all the print objects and set to "OFF" when the third cassette replacement message 272 (described later, see FIG. 14) is displayed on the display unit 27. The error flag at the start of the main process is "OFF" as the initial state.

When the error flag is "OFF", the CPU 21 determines that an error is absent (NO in S42). In this case, the CPU 21 sets, on the RAM 24, the orientation to the parallel orientation (S43). Further, the CPU 21 sets, on the RAM 24, the upper tape length L8 to the object area length L5 (S44). Then the CPU 21 shifts to S101 (see FIG. 13).

When the first condition is not met (NO in S41), the CPU 21 determines whether the second condition is met for the target print object (S51). More precisely, the CPU 21 determines, based on the object area information edited in S14 (see FIG. 7), the lower tape information, and the cassette information corresponding to the target cassette, whether the following four conditions are all met:

object area length L5≤upper tape width L7.
object area width L6≤upper tape width L7.
object area width L6≤object area length L5.
upper tape width L7≤lower tape length L3.

When the second condition is satisfied as in the example illustrated in FIG. 4B (YES in S51), the CPU 21 determines, based on the error flag, whether an error is occurring (S52). When the error flag is "OFF", the CPU 21 determines that an error is absent (NO in S52). In this case, the CPU 21 sets, on the RAM 24, the orientation to the orthogonal orientation (S53). Further, the CPU 21 sets, on the RAM 24, the upper tape length L8 to the object area width L6 (S54). Then the CPU 21 shifts to S101 (see FIG. 13).

Figure 10:
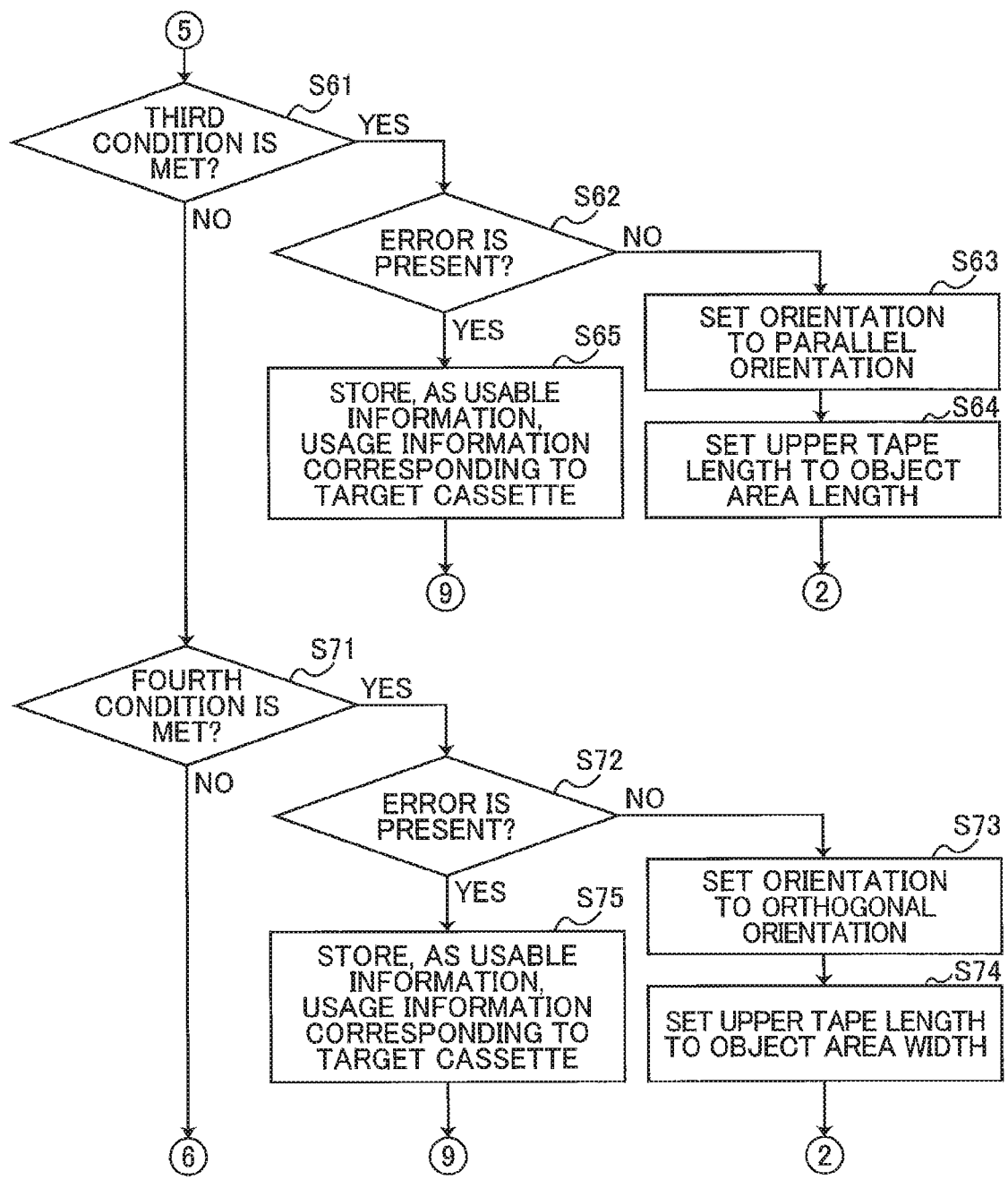
FIG. 10 is a fourth part of the flowchart illustrating the main process.

When the second condition is not satisfied (NO in S51), the CPU 21 determines whether the third condition is satisfied for the target print object as illustrated in FIG. 10

(S61). More precisely, the CPU 21 determines, based on the object area information edited in S14 (see FIG. 7), the lower tape information, and the cassette information corresponding to the target cassette, whether the following four conditions are all satisfied:

object area length L5≤upper tape width L7.
object area width L6≤upper tape width L7.
object area length L5<object area width L6.
upper tape width L7≤lower tape width L4.

When the third condition is met as in the example illustrated in FIG. 4C (YES in S61), the CPU 21 determines, based on the error flag, whether an error is occurring (S62). When the error flag is "OFF", the CPU 21 determines that an error is absent (NO in S62). In this case, the CPU 21 sets, on the RAM 24, the orientation to the parallel orientation (S63). Further, the CPU 21 sets, on the RAM 24, the upper tape length L8 to the object area length L5 (S64). Then the CPU 21 shifts to S101 (see FIG. 13).

When the third condition is not met (NO in S61), the CPU 21 determines whether the fourth condition is met for the target print object (S71). More precisely, the CPU 21 determines, based on the object area information edited in S14 (see FIG. 7), the lower tape information, the cassette information corresponding to the target cassette, whether the following three conditions are all met:

object area length L5≤upper tape width L7.
upper tape width L7<object area width L6.
upper tape width L7≤lower tape length L3.

When the fourth condition is satisfied as in the example illustrated in FIG. 4D (YES in S71), the CPU 21 determines, based on the error flag, whether an error is occurring (S72). When the error flag is "OFF", the CPU 21 determines that an error is absent (NO in S72). In this case, the CPU 21 sets, on the RAM 24, the orientation to the orthogonal orientation (S73). Further, the CPU 21 sets, on the RAM 24, the upper tape length L8 to the object area width L6 (S74). Then the CPU 21 shifts to S101 (see FIG. 13).

Figure 11:
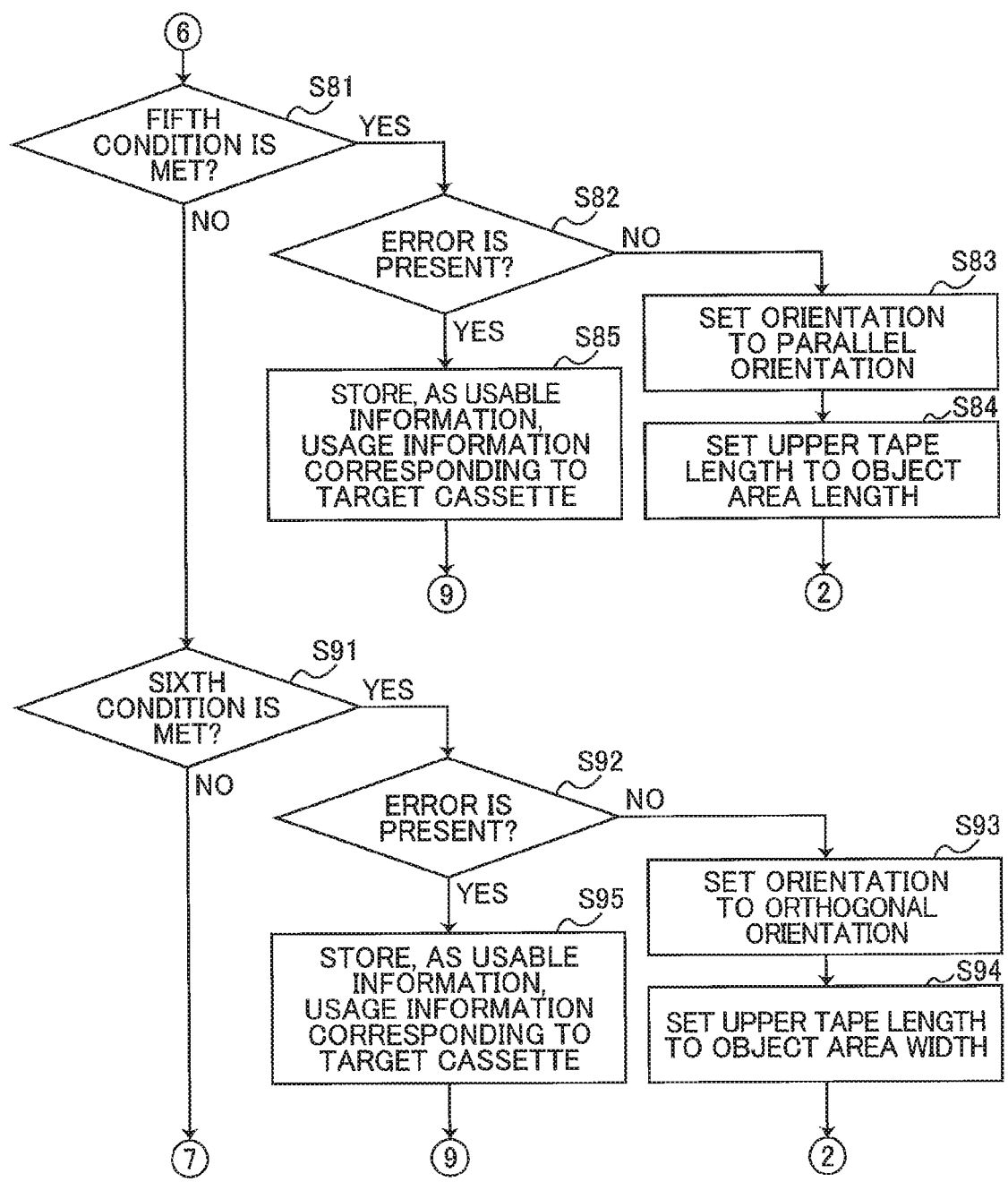
FIG. 11 is a fifth part the flowchart illustrating the main process.

When the fourth condition is not satisfied (NO in S71), the CPU 21 determines whether the fifth condition is satisfied for the target print object as illustrated in FIG. 11 (S81). More specifically, the CPU 21 determines, based on the object area information edited in S14 (see FIG. 7), the lower tape information, and the cassette information corresponding to the target cassette, whether the following five conditions are all satisfied:

object area length L5≤upper tape width L7.
object area width L6≤upper tape width L7.
object area width L6≤object area length L5.
lower tape length L3<upper tape width L7.
upper tape width L7≤lower tape width L4.

When the fifth condition is satisfied as in the example illustrated in FIG. 5A (YES in S81), the CPU 21 determines, based on the error flag, whether an error is occurring (S82). When the error flag is "OFF", the CPU 21 determines that an error is absent (NO in S82). In this case, the CPU 21 sets, on the RAM 24, the orientation to the parallel orientation (S83). Further, the CPU 21 sets, on the RAM 24, the upper tape length L8 to the object area length L5 (S84). Then the CPU 21 shifts to S101 (see FIG. 13).

When the fifth condition is not satisfied (NO in S81), the CPU 21 determines whether the sixth condition is satisfied for the target print object (S91). More precisely, the CPU 21 determines, based on the object area information edited in S14 (see FIG. 7), the lower tape information, and the cassette information corresponding to the target cassette, whether the following five conditions are all met:

object area length L5≤upper tape width L7.
object area width L6≤upper tape width L7.
object area length L5<object area width L6.
lower tape width L4<upper tape width L7.
upper tape width L7≤lower tape length L3.

When the sixth condition is met as in the example illustrated in FIG. 5B (YES in S91), the CPU 21 determines, based on the error flag, whether an error is occurring (S92). When the error flag is "OFF", the CPU 21 determines that an error is absent (NO in S92). In this case, the CPU 21 sets, on the RAM 24, the orientation to the orthogonal orientation (S93). Further, the CPU 21 sets, on the RAM 24, the upper tape length L8 to the object area width L6 (S94). Then the CPU 21 shifts to S101 (see FIG. 13).

Figure 13:
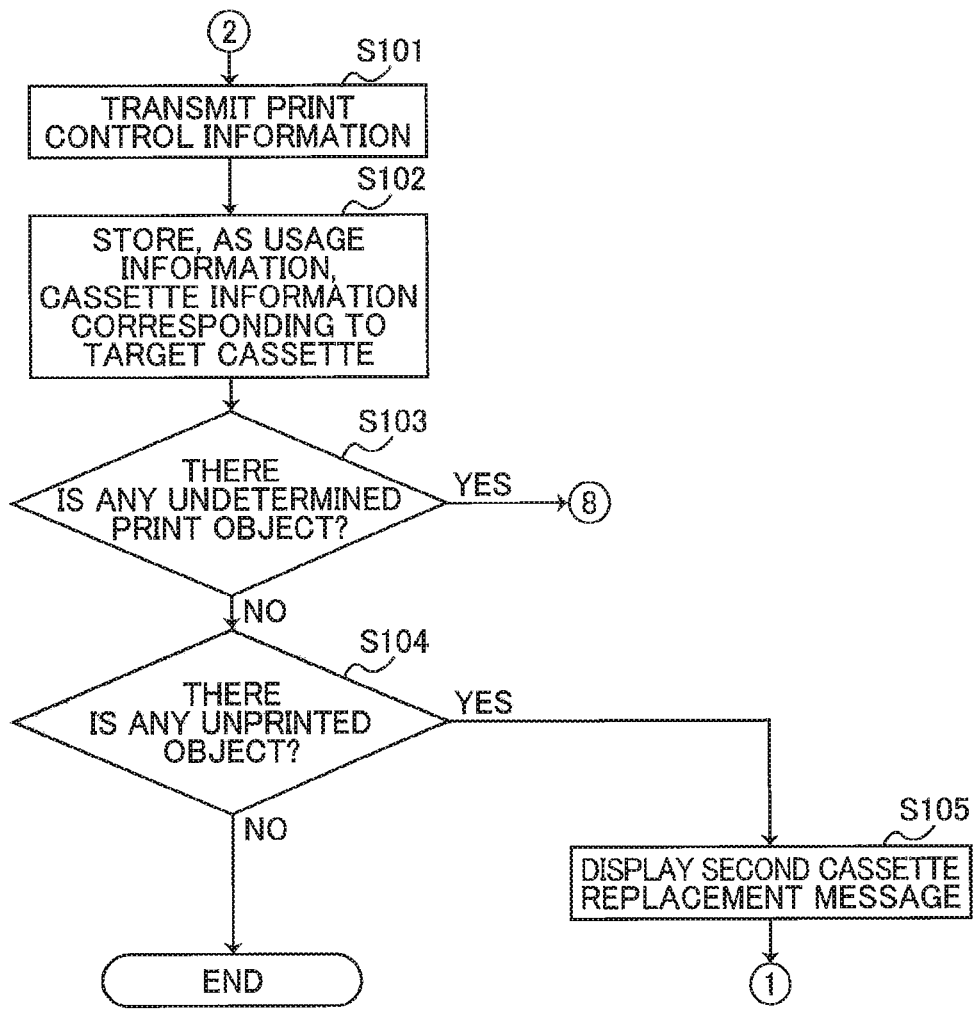
FIG. 13 is a seventh part of the flowchart illustrating the main process.

As illustrated in FIG. 13, in S101, the CPU 21 transmits, to the tape printer 10 over the network 100, the print control information for controlling print operation to be carried out by the tape printer 10 (S101). When printing on the lower tape 41 is performed, the print control information includes information indicating the lower tape length L3 and the lower image information. When printing on the upper tape 42 is performed, the print control information includes information indicating the orientation set in one of S43, S53 (see FIG. 9), S63, S73 (see FIG. 10), S83, and S93 (see FIG. 11), information indicating the upper tape length L8 set in one of S44, S54 (see FIG. 9), S64, 874 (see FIG. 10), S84, and S94 (see FIG. 11), and information indicating the shape of the print object currently designated as the target print object (i.e., the shape of the target print object as of execution of S101).

In the tape printer 10, the CPU 11 acquires the print control information from the print control device 20 over the network 100. The CPU 11 executes printing based on the acquired print control information. In the example of FIG. 3, a lower label having the lower image "☆" printed thereon is created. For example, when "•" which is one of the upper objects is designated as the print object, an upper label having "•" printed thereon is created.

The CPU 21 refers to the RAM 24 to store the cassette information corresponding to the target cassette as usage information in the flash memory 22 (8102). That is, the usage information indicates the tape cassette 30 that has been used in printing and, more precisely, the color and the tape width of the ink ribbon. The CPU 21 refers to the RAM 24 to determine whether there are one or more undetermined print objects among the print objects designated in S34 (see FIG. 8) (S103).

In the example of FIG. 3, when "▲" that is one of the upper objects designated as the print objects has not yet been designated as the target print object, it means that there are one or more undetermined print objects among the print objects designated in S34 (YES in S103), so the CPU 21 returns to S35 (see FIG. 8). The CPU 21 then performs the above-described process from S35 for the undetermined print object "▲". More specifically, the CPU 21 designates the undetermined print object "▲" as the target print object in S35. Then, when any one of the first to sixth conditions is met for the target print object (i.e., the print object "▲") in the above process, an upper label on which "▲" that is one of the upper objects has been printed is created by the tape printer 10 in the process of S101 performed subsequently. Thus, in the example of FIG. 3, there are created one lower label having the lower image "▲" printed thereon and two upper labels: one having "•" (i.e., one of the two upper objects) printed thereon, and the other having "▲" (the other of the two upper objects) printed thereon.

When it has been determined, for each of the upper objects designated as the print objects in S34, whether any one of the first to sixth conditions is met, there is no undetermined print object left. When there is no undetermined print object (NO in S103), the CPU 21 refers to the RAM 24 to determine whether there are one or more lower images or upper objects (hereinafter, collectively referred to as "unprinted object") that have not yet been transmitted as the print control information in S101 (S104).

When there are one or more unprinted objects (YES in S104), the CPU 21 displays a second cassette replacement message (not illustrated) on the display unit 27 (S105). The second cassette replacement message says, e.g., "printing with the attached tape cassette is completed, so please attach another tape cassette". The second cassette replacement message prompts the user to replace the tape cassette 30 currently attached to the cassette mounting section 5 with another tape cassette 30.

The CPU 21 returns to S21 (see FIG. 7). The user has confirmed the second cassette replacement message and replaces the tape cassette 30 currently attached to the cassette mounting section 5 with another tape cassette 30. In S21, the CPU 21 acquires the cassette information corresponding to the newly attached tape cassette 30 (S21). The CPU 21 performs the above-described process of S22 and subsequent steps based on the acquired cassette information.

When there is no unprinted object (NO in S104), the CPU 21 ends the main process. Thus, printing of the lower image on the lower tape 41 and printing of the upper objects on the upper tapes 42 are completed. The user can create a multicolored label by affixing the created upper labels to the created lower label.

Figure 12:
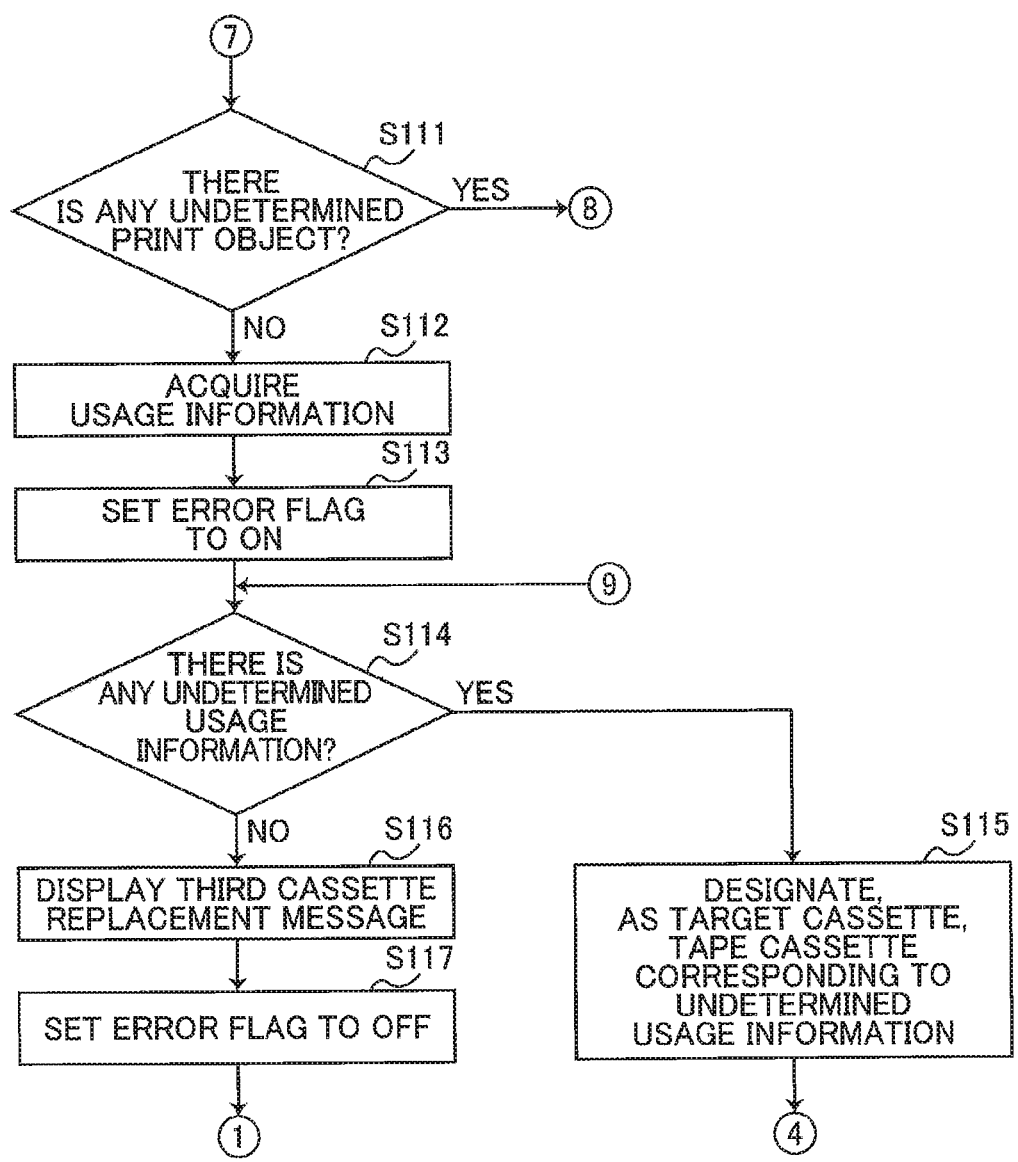
FIG. 12 is a sixth part of the flowchart illustrating the main process.

As illustrated in FIG. 11, when the sixth condition is not satisfied in S91 (NO in S91), that is, when none of the first to sixth conditions is met as in the examples illustrated in FIGS. 6A to 6E, the CPU 21 refers to the RAM 24 to determine whether there are one or more undetermined print objects as illustrated in FIG. 12 (S111). When there are one or more undetermined print objects (YES in S111), the CPU 21 returns to S35 (see FIG. 8). The CPU performs the above-described process from S35 for the undetermined upper object.

When it has been determined for all the upper objects designated as the print objects in S34 that none of the first to sixth conditions is satisfied, there is no undetermined print object left. When there is no undetermined print object (NO in S11), the CPU 21 acquires one or more sets of the usage information from the flash memory 22 (S112). The CPU 21 then stores the acquired one or more sets of the usage information in the RAM 24.

The CPU 21 set the error flag to "ON" on the RAM 24 (113). The CPU 21 refers to the RAM 24 to determine whether there are one or more sets of undetermined usage information among the one or more sets of the usage information acquired in S112. The undetermined usage information is the usage information that has not yet been designated in S115 (described later)(S114).

When there are one or more sets of the undetermined usage information (YES in S114), on the RAM 24, the CPU 21 designates the tape cassette 30 corresponding to any of the one or more sets of the undetermined usage information as the target cassette (S115). The CPU 21 then returns to S41 (see FIG. 9).

The CPU 21 performs, based on the usage information corresponding to the target cassette, the determinations of S41, S51, S61, S71, S81, and S91 so as to identify information (hereinafter, referred to as "usable information") based on the upper tape width L7 that meets at least one of the first to sixth conditions.

As illustrated in FIG. 9, when the first condition is met for the target cassette designated in S115 (YES in S41), an error is determined to be occurring since the error flag is "ON" (S42). The CPU 21 stores, in the RAM 24, the usage information corresponding to the target cassette as the usable information (S45). The CPU 21 then shifts to S114 (see FIG. 12). When the second condition is met for the target cassette designated in S115 (YES in S51), an error is determined to be occurring since the error flag is "ON" (852). The CPU 21 stores, in the RAM 24, the usage information corresponding to the target cassette as the usage information (855). The CPU 21 then shifts to S114 (see FIG. 12).

As illustrated in FIG. 10, when the third condition is met for the target cassette designated in S115 (YES in S61), an error is determined to be occurring since the error flag is "ON" (862). The CPU 21 stores, in the RAM 24, the usage information corresponding to the target cassette as the usable information (S65). The CPU 21 then shifts to S114 (see FIG. 12). When the fourth condition is met for the target cassette designated in S115 (YES in S71), an error is determined to be occurring since the error flag is "ON" (872). The CPU 21 stores, in the RAM 24, the usage information corresponding to the target cassette as the usable information (S75). The CPU 21 then shifts to S114 (see FIG. 12).

As illustrated in FIG. 11, when the fifth condition is met for the target cassette designated in S115 (YES in S81), an error is determined to be occurring since the error flag is "ON" (882). The CPU 21 stores, in the RAM 24, the usage information corresponding to the target cassette as the usable information (885). The CPU 21 then shifts to S114 (see FIG. 12). When the sixth condition is met for the target cassette designated in S115 (YES in S91), an error is determined to be occurring since the error flag is "ON" (S92). The CPU 21 stores, in the RAM 24, the usage information corresponding to the target cassette as the usable information (S95). The CPU 21 then shifts to S114 (see FIG. 12).

When the determinations of S41, S51 (see FIG. 9), S61, S71 (see FIG. 10), S81, S91 (see FIG. 11) have been performed for all the one or more sets of the usage information stored in the flash memory 22 as illustrated in FIG. 12, there is no undetermined usage information left (NO in S114). In this case, the CPU 21 displays the third cassette replacement message 272 (see FIG. 14) on the display unit 27 (S116).

Figure 14:
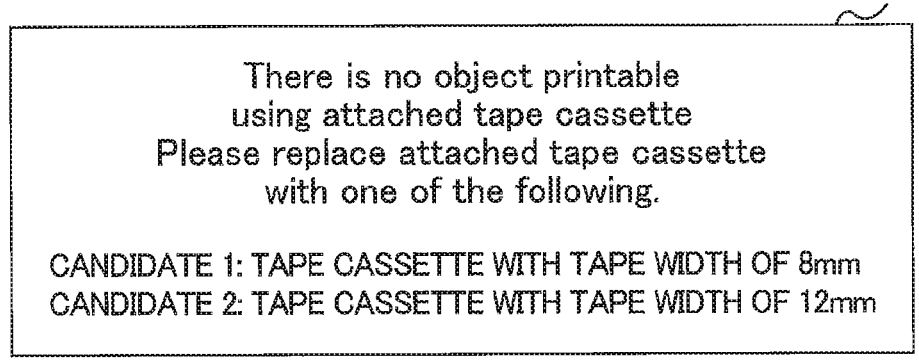
FIG. 14 is a view illustrating a third cassette replacement message 272.

As illustrated in FIG. 14, the third cassette replacement message 272 indicates, as the usable information, one or more tape cassettes 30 (specifically, tape width) corresponding to respective ones of one or more sets of the usage information stored as the usable information in the RAM 24. The example of FIG. 14 illustrates a case where two sets of the usage information are stored in the RAM 24 as the usable information; one of the two sets of the usage information corresponds to the tape cassette 30 having a tape width of 8 mm, and the other of the two sets corresponds to the tape cassette 30 having a tape width of 12 mm. In this manner, the third cassette replacement message 272 prompts the user to replace the tape cassette 30 currently attached to the cassette mounting section 5 with another tape cassette 30 having a tape width that has been previously used.

The CPU 21 sets the error flag to "OFF" on the RAM 24 (S117). The CPU 21 returns to S21 (see FIG. 7). When the user has confirmed the third cassette replacement message, the user replaces the tape cassette 30 currently attached to the cassette mounting section 5 with another tape cassette 30. In S21, the CPU 21 acquires the cassette information corresponding to the newly attached tape cassette 30 (S21). The CPU 21 performs the above-described process of S22 and subsequent steps based on the acquired cassette information.

As described above, when the precondition is met and any one of the first to sixth conditions is met, the orientation is set to either the parallel orientation or orthogonal orientation. Thus, the print control device 20 can print the upper image on the upper tape 42 so as to allow the entire upper image to be disposed within the range of the lower label when the upper label 43 is affixed to the lower label. The orientation (parallel or orthogonal orientation) is set depending on the relationship between the size of the object area 75 and the upper tape width L7. Accordingly, even when the upper tape 42 cannot be used in printing of the print object in the parallel orientation since the object area width L6 is larger than the upper tape width L7, the upper tape 42 becomes usable by setting the orientation to the orthogonal orientation as long as the object area length L5 is smaller than the upper tape width L7. Thus, the print control device 20 can suppress the tape width available as the upper tape 42 from being limited.

When the precondition is met and any one of the first to sixth conditions is met, the orientation is set to either the parallel orientation or orthogonal orientation and, further, the upper tape length L8 is set to either the object area length L5 or object area width L6. Specifically, when the orientation is set to the parallel orientation, the upper tape length L8 is set to the object area length L5, while when the orientation is set to the orthogonal orientation, the upper tape length L8 is set to the object area width L6. Thus, the print control device 20 can set the upper tape length L8 to a length according to the size of the object area 75. That is, the print control device 20 suppresses the upper tape length L8 from being increased, thereby suppressing an increase in the amount of the upper tape 42 to be used.

The first to sixth conditions are set so that the upper label 43 to can fall within the range of the lower label in a state where the upper label 43 is affixed to the lower label. This means that when any one of the first to sixth conditions is satisfied, the upper label 43 is prevented from running off the lower label when the upper label 43 is affixed to the lower label. Thus, the print control device 20 can enhance the appearance of the multi-colored label.

The third cassette replacement message 272 indicates the usable information. Thus, when the third cassette replacement message 272 is displayed on the display unit 27, the user can grasp the tape width according to the usable information. The user replaces the tape cassette 30 currently in use with another tape cassette 30 having a tape width according to the usable information to thereby allow the print control device 20 to execute print control. Thus, the print control device 20 can provide a better user-friendliness in comparison with a configuration in which the usable information is not displayed in the third cassette replacement message 272.

The third cassette replacement message 272 indicates the usage information as the usable information. This allows the user to select, from among the tape widths specified in the usage information, a tape width corresponding to the usable information. Accordingly, the print control device 20 can be improved in user-friendliness compared with a configuration in which, in spite of the fact that tape widths indicated by the usable information exist among the tape widths indicated by the usage information, information on the tape widths that have never been used before is displayed as the usable information in the third cassette replacement message 272.

The base material of the upper tape 42 is transparent or translucent. Thus, by affixing the upper label 43 to the lower label, a so-called multi-colored tape can be created in which a part of the lower label to which the upper label 43 has been affixed can be seen through the upper label 43.

While the description has been made in detail with reference to the specific embodiment, it would be apparent to those skilled in the art that many modifications and variations may be made to the above-described embodiment. In the following description, various modifications will be described while focusing on differences from the above-described embodiment.

For example, although a clear tape is employed as the upper tape 42 in the above-described embodiment, a normal tape may be employed as the upper tape 42 instead of a clear tape. In this case, the user can easily correct the object printed on the lower label. More precisely, the user may affix the upper label 43 having a corrected object printed thereon to an object to be corrected in the image printed on the lower label. In this case, the entire image need not be printed again on the lower tape for correcting only some objects in the image. Thus, the print control device 20 can suppress the amount of the tape 40 to be used.

The first to fourth conditions may each be changed. When the first to fourth conditions are changed as follows, the fifth and sixth conditions may be omitted. That is, in this case, the determinations of S81 and S91 may be omitted.

For example, the first condition may include the following two conditions (that is, the first condition may be met when the following two conditions are both met):
object area width L6<upper tape width L7.
upper tape width L7<object area length L5.

The second condition may include the following three conditions (that is, the second condition may be met when the following three conditions are all met):
object area length L5≤upper tape width L7.
object area width L6≤upper tape width L7.
object area width L6≤object area length L5.

The third condition may include the following three conditions (that is, the third condition may be met when the following three conditions are all met):
object area length L5≤upper tape width L7.
object area width L6≤upper tape width L7.
object area length L5≤object area width L6.

The fourth condition may include the following two conditions (that is, the fourth condition may be met when the following two conditions are both met):
object area length L5≤upper tape width L7.
upper tape width L7<object area width L6.

Under the first to fourth conditions according to the above modification, the print control device 20 can further suppress limitation of available width of the upper tape 42.

In the above modification, when none of the first to fourth conditions is satisfied, the third cassette replacement message 272 may be displayed on the display unit 27, and the usable information may be information based on the upper tape width L7 that satisfies at least one of the first to fourth conditions. In this case, when the third cassette replacement message 272 is displayed on the display unit 27, the user can grasp a tape width according to the usable information. Thus, similarly to the above embodiment, the print control device 20 according to the present modification can provide a better user-friendliness in comparison with a configuration in which the usable information is not displayed in the third cassette replacement message 272.

In the above embodiment, the upper tape length L8 is set to the object area length L5 when the orientation is set to the parallel orientation and to the object area width L6 when the orientation is set to the orthogonal orientation. However, the upper tape length L8 may be set to a length other than the object area length L5 when the orientation is set to the parallel orientation and to a length other than the object area width L6 when the orientation is set to the orthogonal orientation. For example, the upper tape length L8 may be set to a length that the user selects from among lengths larger than the object area length L5 when the orientation is set to the parallel orientation and to a length that the user selects from among lengths larger than the object area width L6 when the orientation is set to the orthogonal orientation. In this case, in the print control device 20, the upper tape length L8 of the upper label 43 can be set to a user's desired length.

As illustrated in FIG. 15, when the third condition is met, and the orientation is set to the parallel orientation, the CPU 21 may set the upper tape length L8 to the sum of the object area length L5 and a length L9. The length 9 is a length between one end of the lower tape 41 in the longitudinal direction and one end of the print object in the longitudinal direction of the lower tape 41; the one end of the print object is closer to the one end of the lower tape 41 than the other end of the print object is to the one end of the lower tape 41.

The CPU 21 may add, to the print control information, information for instructing to provide a margin L0 equivalent to the length L9 on one end side of the print object in the longitudinal direction of the lower tape 41. In this case, the user can easily arrange the upper object at a desired position on the lower label by affixing the lower label to the upper label 43 with the one ends thereof in the longitudinal direction aligned with each other.

The CPU 21 may set the upper tape length L8 to the sum of the object area length L5 and a length between the other end of the lower tape 41 in the longitudinal direction and the other end of the print object in the longitudinal direction of the lower tape 41. For example, when the second condition is met and the orientation is set to the orthogonal direction, the CPU 21 may set the upper tape length L8 to the sum of the object area width L6 and a length between one end or the other end of the lower tape 41 in the width direction and one end or the other end of the print object in the longitudinal direction of the lower tape 41.

In the above embodiment, the tape widths are displayed in the third cassette replacement message 272 according to the usage information stored in the RAM 24 as the usable information. Alternatively, for example, the model numbers and the like of the tape cassettes 30 may be displayed in the third cassette replacement message 272 according to the usage information stored in the RAM 24 as the usable information. In this case, model number information may be included in the usage information, or a table defining the model numbers according to the usage information may be stored in the ROM 23.

In the third cassette replacement message 272, a tape width that is not stored in the flash memory 22 may be displayed as the usage information. In this case, a plurality of tape widths may be stored as display candidates in the ROM 23, and a tape cassette 30 corresponding to one undetermined tape width of the plurality of tape widths may be set as the target cassette by referencing the ROM 23 in S115. Further alternatively, in the third cassette replacement message 272, only a message prompting the user to replace the tape cassette 30 may be displayed.

In place of or in addition to the third cassette replacement message 272, an error notification may be issued in the form of voice or LED illumination. For example, when the print control device 20 is provided with a speaker, only error sound may be outputted from the speaker. Like the third cassette replacement message 272, the first cassette replacement message, second cassette replacement message, and upper image error massage are not limited to the above embodiment in terms of the notification manner.

Further, in the above embodiment, the CPU 21 displays the first cassette replacement message, second cassette replacement message, third cassette replacement message 272, and upper image error message on the display unit 27. Alternatively, the CPU 21 may transmit display instructions for displaying those messages to the tape printer 10 and, upon receiving the display instruction, the tape printer 10 may display a message corresponding to the received display instruction on the display unit 3.

In the above embodiment, when an error occurs, a tape cassette 30 corresponding to the usage information is set as the target cassette, and the determinations of S41, S51, S61, S71, S81, and S91 are performed based on the usage information, whereby whether the usable information is included in the usage information is determined. Alternatively, a plurality of tape widths may be stored in advance in the ROM 23, and when an error occurs, it may be determined, for each of the tape widths stored in the ROM 23, whether any one of the first to sixth conditions is satisfied. It may be determined whether a tape width that has been determined to meet any one of the first to sixth conditions is included in the tape widths corresponding to the usage information. In the third cassette replacement message 272, a tape width determined to be included in the tape widths corresponding to the usage information may be displayed as the usable information.

In the above embodiment, the CPU 21 receives the cassette information from the tape printer 10 to acquire the upper tape width L7. Alternatively, the user may operate the input unit 26 to input the upper tape width L7 to the print control device 20. That is, the CPU 21 may acquire the upper tape width L7 inputted by the user through the input unit 26.

Further, in the tape printer 10, the CPU 11 reads out the cassette information from the identification part 32 through the reading device 18. Alternatively, the tape cassette 30 may be provided with a storage (e.g., an RF tag) storing therein the cassette information, and the CPU 11 may read out the cassette information from the storage through the reading device 18.

Further, the user may operate the input part 2 to input the cassette information to the tape printer 10. That is, the CPU 11 may acquire the cassette information inputted by the user through the input part 2. Thus, the CPU 21 may employ any methods to acquire the cassette information (that is, information indicating at least the upper tape width L7).

In the above embodiment, the image area 71 is defined as the minimum rectangle surrounding the upper image. Alternatively, the image area 71 may be a rectangle having a size larger than the minimum rectangle surrounding the upper image. That is, a margin may be provided at one side of the upper image in at least one of the width direction and longitudinal direction of the lower tape 41. In this case, the image area 71 is larger in size than the minimum rectangular surrounding the upper image by the margin.

Similarly, the object area 75 may be a rectangle having a size larger than the minimum rectangle surrounding the print object. That is, a margin may be provided at one side of the print object in at least one of the width direction and longitudinal direction of the lower tape 41. In this case, the object area 75 is larger in size than the minimum rectangular surrounding the print object by the margin.

In the above embodiment, for example, when it is determined whether the tape cassette 30 corresponding to the cassette information is the upper tape cassette (S23) or whether the tape cassette 30 corresponding to the cassette information is the lower tape cassette (S24), the color of the tape 40 may be taken into consideration. In this case, the cassette information may further include information indicating the color of the tape 40, and the label data may further include information indicating the color of the lower tape 41 and the color of the upper tape 42. In this case, in S34, an upper object corresponding to the color of the tape 40 may be designated.

The main process may be performed partly or entirely in the tape printer 10. That is, the CPU 11 may execute part of or the entire main process. For example, the determination on whether to set the orientation to the parallel orientation or orthogonal orientation, and the determination on whether to set the upper tape length L8 to the object area length L5 or object area width L6 (S41, S51, S61, S71, S81, and S91) may be executed by the CPU 11.

In the above embodiment, for example, the usage information is stored in the flash memory 22 of the print control device 20. Alternatively, the usage information may be stored in the flash memory 12 of the tape printer 10. In this case, for example, in S112 the CPU 21 may transmit, to the tape printer 10 over the network 100, a usage information acquisition instruction for acquiring the usage information. In the tape printer 10, when receiving the usage information acquisition instruction from the print control device 20, the CPU 11 may acquire the usage information from the flash memory 12 and transmit the acquired usage information to the print control device 20 over the network 100. Thus, the print control device 20 may acquire the usage information from the tape printer 10 over the network 100.

In the above embodiment, the print control device 20 is connected to the tape printer 10 over the network 100. Alternatively, the print control device 20 may be connected to the tape printer 10 through a cable and the like.

The content to be displayed on the editing screen 271 is not limited to that described in the above embodiment. For example, although the lower label image 91 and lower image 92 are displayed on the editing screen 271 in the above embodiment, they may not be displayed. That is, it is only necessary that at least the upper image 93 be displayed on the editing screen 271.

In the above-described embodiment, the upper tape 42 includes a transparent or translucent base material but the upper tape 42 is not limited to this. For example, in place of the transparent or translucent base material, the upper tape 42 may include an opaque base material on which the print objects are to be printed. In this case, by affixing the upper label 43 to the lower label, a part of the lower label to which the upper label 43 has been affixed can be hidden.

In place of the CPU 21, the print control device 20 may employ a microcomputer, application-specific integrated circuits (ASICs), field-programmable gate arrays (FPGAs), or the like as the processor. Portions of the main process may be distributed among a plurality of processors. The non-transitory storage medium may be any storage medium capable of holding information, regardless of the duration that the information can be stored. The non-transitory storage medium need not include transitory storage media (conveyed signals, for example). The program may be downloaded from a server connected to the network 100 (i.e., transmitted as a transmission signal) and stored in the flash memory 22, for example. In this case, the program may be saved in a non-transitory storage medium, such as a hard disk drive provided in the server. The modifications described above may be combined in any way that does not produce inconsistencies.

What is claimed is:

1. A print control device for performing a print control for printing one or more objects on an upper tape to be affixed to a lower tape, the print control device comprising a controller configured to perform:
    (a) editing an image constituted by one or more objects including:
        one or more lower objects to be printed on the lower tape; and
        one or more upper objects to be printed on the upper tape;
    (b) acquiring:
        an image area length that is a length of an image area in a longitudinal direction of the lower tape, the image area being an area occupied by a rectangle surrounding the image edited in (a);
        an image area width that is a length of the image area in a width direction of the lower tape;
        a lower tape length that is a length of the lower tape in the longitudinal direction; and
        a lower tape width that is a length of the lower tape in the width direction;
    (c) designating one upper object from among the one or more upper objects;
    (d) acquiring:
        an object area length that is a length of an object area in the longitudinal direction, the object area being an area occupied by a rectangle surrounding the one upper object designated in (c); and
        an object area width that is a length of the object area in the width direction;
    (e) acquiring an upper tape width that is a length of the upper tape in a width direction of the upper tape;
    (f) setting, when a precondition and a first condition are both met, an orientation to a parallel orientation, the orientation being a direction in which the upper tape is disposed relative to the one or more lower objects disposed on the lower tape, the parallel orientation being an orientation in which a longitudinal direction of the upper tape is made to coincide with the longitudinal direction of the lower tape;
    (g) setting, when the precondition and a second condition are both met, the orientation to an orthogonal orientation, the orthogonal orientation being an orientation in which the longitudinal direction of the upper tape is made to coincide with the width direction of the lower tape;
    (h) setting, when the precondition and a third condition are both met, the orientation to the parallel orientation;
    (i) setting, when the precondition and a fourth condition are both met, the orientation to the orthogonal orientation;
    (j) issuing, when the precondition is met and all of the first condition, the second condition, the third condition, and the fourth condition are not met, an error notification; and
    (k) executing the print control on the basis of the orientation set in any one of (f), (g), (h), and (i),
    wherein the precondition includes:
        a condition that the image area length is smaller or equal to the lower tape length; and a condition that the image area width is smaller or equal to the lower tape width, wherein the first condition includes:
a condition that the object area width is smaller than the upper tape width; and
a condition that the upper tape width is smaller than the object area length, wherein the second condition includes:
a condition that the object area width is smaller than or equal to the object area length; and
a condition that the object area length is smaller than or equal to the upper tape width, wherein the third condition includes:
a condition that the object area length is smaller than the object area width; and
a condition that the object area width is smaller than or equal to the upper tape width, and wherein the fourth condition includes:
a condition that the object area length is smaller than or equal to the upper tape width; and
a condition that the upper tape width is smaller than the object area width.

2. A print control device for performing a print control for printing one or more objects on an upper tape to be affixed to a lower tape, the print control device comprising a controller configured to perform:
(a) editing an image constituted by one or more objects including:
one or more lower objects to be printed on the lower tape; and
one or more upper objects to be printed on the upper tape;
(b) acquiring:
an image area length that is a length of an image area in a longitudinal direction of the lower tape, the image area being an area occupied by a rectangle surrounding the image edited in (a);
an image area width that is a length of the image area in a width direction of the lower tape;
a lower tape length that is a length of the lower tape in the longitudinal direction; and
a lower tape width that is a length of the lower tape in the width direction;
(c) designating one upper object from among the one or more upper objects;
(d) acquiring:
an object area length that is a length of an object area in the longitudinal direction, the object area being an area occupied by a rectangle surrounding the one upper object designated in (c); and
an object area width that is a length of the object area in the width direction;
(e) acquiring an upper tape width that is a length of the upper tape in a width direction of the upper tape;
(f) when a precondition and a first condition are both met,
(f1) setting an orientation to a parallel orientation, the orientation being a direction in which the upper tape is disposed relative to the one or more lower objects disposed on the lower tape, the parallel orientation being an orientation in which a longitudinal direction of the upper tape is made to coincide with the longitudinal direction of the lower tape; and
(f2) setting an upper tape length to the object area length acquired in (d), the upper tape length being a length of the upper tape in the longitudinal direction of the upper tape;

(g) when the precondition and a second condition are both met,
(g1) setting the orientation to an orthogonal orientation, the orthogonal orientation being an orientation in which the longitudinal direction of the upper tape is made to coincide with the width direction of the lower tape; and
(g2) setting the upper tape length to the object area width acquired in (d);
(h) when the precondition and a third condition are both met,
(h1) setting the orientation to the parallel orientation; and
(h2) setting the upper tape length to the object area length acquired in (d);
(i) when the precondition and a fourth condition are both met,
(i1) setting the orientation to the orthogonal orientation; and
(i2) setting the upper tape length to the object area width acquired in (d);
(j) issuing, when the precondition is met and all of the first condition, the second condition, the third condition, and the fourth condition are not met, an error notification; and
(k) executing the print control on the basis of the orientation and the upper tape length which are set in any one of (f), (g), (h), and (i), wherein the precondition includes:
a condition that the image area length is smaller or equal to the lower tape length; and
a condition that the image area width is smaller or equal to the lower tape width, wherein the first condition includes:
a condition that the object area width is smaller than the upper tape width; and
a condition that the upper tape width is smaller than the object area length, wherein the second condition includes:
a condition that the object area width is smaller than or equal to the object area length; and
a condition that the object area length is smaller than or equal to the upper tape width, wherein the third condition includes:
a condition that the object area length is smaller than the object area width; and
a condition that the object area width is smaller than or equal to the upper tape width, and wherein the fourth condition includes:
a condition that the object area length is smaller than or equal to the upper tape width; and
a condition that the upper tape width is smaller than the object area width.

3. A print control device for performing a print control for printing one or more objects on an upper tape to be affixed to a lower tape, the print control device comprising a controller configured to perform:
(a) editing an image constituted by one or more objects including:
one or more lower objects to be printed on the lower tape; and
one or more upper objects to be printed on the upper tape;
(b) acquiring:
an image area length that is a length of an image area in a longitudinal direction of the lower tape, the image area being an area occupied by a rectangle surrounding the image edited in (a);

an image area width that is a length of the image area in a width direction of the lower tape;

a lower tape length that is a length of the lower tape in the longitudinal direction; and a lower tape width that is a length of the lower tape in the width direction;

(c) designating one upper object from among the one or more upper objects;

(d) acquiring:

an object area length that is a length of an object area in the longitudinal direction, the object area being an area occupied by a rectangle surrounding the one upper object designated in (c); and an object area width that is a length of the object area in the width direction;

(e) acquiring an upper tape width that is a length of the upper tape in a width direction of the upper tape;

(f) when a precondition and a first condition are both met, (f1) setting an orientation to a parallel orientation, the orientation being a direction in which the upper tape is disposed relative to the one or more lower objects disposed on the lower tape, the parallel orientation being an orientation in which a longitudinal direction of the upper tape is made to coincide with the longitudinal direction of the lower tape; and (f2) setting an upper tape length to the object area length acquired in (d), the upper tape length being a length of the upper tape in the longitudinal direction of the upper tape;

(g) when the precondition and a second condition are both met, (g1) setting the orientation to an orthogonal orientation, the orthogonal orientation being an orientation in which the longitudinal direction of the upper tape is made to coincide with the width direction of the lower tape; and (g2) setting the upper tape length to the object area width acquired in (d);

(h) when the precondition and a third condition are both met, (h1) setting the orientation to the parallel orientation; and (h2) setting the upper tape length to the object area length acquired in (d);

(i) when the precondition and a fourth condition are both met, (i1) setting the orientation to the orthogonal orientation; and (i2) setting the upper tape length to the object area width acquired in (d);

(j) when the precondition and a fifth condition are both met, (j1) setting the orientation to the parallel orientation; and (j2) setting the upper tape length to the object area length acquired in (d);

(k) when the precondition and a sixth condition are both met, (k1) setting the orientation to the orthogonal orientation; and (k2) setting the upper tape length to the object area width acquired in (d);

(l) issuing, when the precondition is met and all of the first condition, the second condition, the third condition, the fourth condition, the fifth condition, and the sixth condition are not met, an error notification; and (m) executing the print control on the basis of the orientation and the upper tape length which are set in any one of (f), (g), (h), (i), (j) and (k), wherein the precondition includes:

a condition that the image area length is smaller or equal to the lower tape length; and a condition that the image area width is smaller or equal to the lower tape width, wherein the first condition includes:

a condition that the object area width is smaller than the upper tape width;

a condition that the upper tape width is smaller than the object area length; and a condition that the upper tape width is smaller than or equal to the lower tape width, wherein the second condition includes:

a condition that the object area width is smaller than or equal to the object area length;

a condition that the object area length is smaller than or equal to the upper tape width; and a condition that the upper tape width is smaller than or equal to the lower tape length, wherein the third condition includes:

a condition that the object area length is smaller than the object area width;

a condition that the object area width is smaller than or equal to the upper tape width; and a condition that the upper tape width is smaller than or equal to the lower tape width, wherein the fourth condition includes:

a condition that the object area length is smaller than or equal to the upper tape width;

a condition that the upper tape width is smaller than the object area width; and a condition that the upper tape width is smaller than or equal to the lower tape length, wherein the fifth condition includes:

a condition that the object area width is smaller than or equal to the object area length;

a condition that the object area length is smaller than or equal to the upper tape width;

a condition that the upper tape width is smaller than or equal to the lower tape width; and a condition that the lower tape length is smaller than the upper tape width, wherein the sixth condition includes:

a condition that the object area length is smaller than the object area width;

a condition that the object area width is smaller than or equal to the upper tape width;

a condition that the upper tape width is smaller than or equal to the lower tape length; and a condition that the lower tape width is smaller than the upper tape width.

4. The print control device according to claim 1, wherein, the error notification indicates a set of usable information based on the upper tape width which meets at least one of the first condition, the second condition, the third condition, and the fourth condition.

5. The print control device according to claim 3, wherein, the error notification indicates a set of usable information based on the upper tape width which meets at least one of the first condition, the second condition, the third condition, and the fourth condition, the fifth condition, and the sixth condition.

6. The print control device according to claim 4, wherein the controller is configured to further perform:
(n) determining whether the set of usable information exists in one or more sets of usage information stored in a storage, the one or more sets of usage information being information based on respective ones of one or more upper tape widths of one or more upper tapes for which the print control has been performed,
wherein, when the set of usable information is determined to exist in one or more sets of usage information stored in the storage, the error notification indicates a set of usage information determined to be the set of usable information.

7. The print control device according to claim 1, wherein the upper tape includes a transparent or translucent base material on which the one or more upper objects are to be printed.

8. The print control device according to claim 1, wherein the upper tape includes an opaque base material on which the one or more upper objects are to be printed.

* * * * *